U S011340460B2

(12) United States Patent
Muldoon et al.

(10) Patent No.: US 11,340,460 B2
(45) Date of Patent: May 24, 2022

(54) LOW-POWER SEMI-PASSIVE RELATIVE SIX-DEGREE-OF- FREEDOM TRACKING

(71) Applicant: Google LLC, Mountain View, CA (US)

(72) Inventors: Ian Muldoon, Mountain View, CA (US); Clayton Kimber, Mountain View, CA (US); Jeremy Swerdlow, Mountain View, CA (US); Srivatsan Ravindran, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/949,027

(22) Filed: Oct. 9, 2020

(65) Prior Publication Data

US 2021/0356743 A1 Nov. 18, 2021

Related U.S. Application Data

(63) Continuation-in-part of application No. PCT/US2020/070057, filed on May 18, 2020.

(51) Int. Cl.
*G02B 27/01* (2006.01)
*G06F 3/0346* (2013.01)
*G06T 19/00* (2011.01)

(52) U.S. Cl.
CPC ....... *G02B 27/0172* (2013.01); *G06F 3/0346* (2013.01); *G06T 19/006* (2013.01);
(Continued)

(58) Field of Classification Search
CPC ........ G02B 27/0172; G02B 2027/0138; G02B 2027/014; G02B 2027/0178; G02B 2027/0187; G06F 3/0346; G06T 19/006
See application file for complete search history.

(56) References Cited

U.S. PATENT DOCUMENTS 8,179,604 B1 * 5/2012 Prada Gomez .... G02B 27/0093
359/630
8,313,379 B2 * 11/2012 Ikeda .................... A63F 13/213
463/38
(Continued)

FOREIGN PATENT DOCUMENTS

| CN | 107407965 A | 11/2017 |
|---|---|---|
| EP | 3268846 A1 | 1/2018 |
| WO | 2016144560 A1 | 9/2016 |

OTHER PUBLICATIONS

International Search Report and Written Opinion for PCT Application No. PCT/US2020/070057, dated Feb. 8, 2021, 12 pages.
(Continued)

*Primary Examiner* — Dmitriy Bolotin
(74) *Attorney, Agent, or Firm* — Brake Hughes Bellermann LLP

(57) ABSTRACT

A system for tracking a position and an orientation of an external device such as a smart watch or a handheld controller relative to a head mounted display (HMD) device is provided. A combination of active markers and passive markers on the external device may be detected by a point tracking camera of the HMD to collect position data for the external device relative to the HMD. Acceleration and/or orientation data of the external device relative to the HMD may be collected from an inertial measurement unit(s) (IMU(s)) of the external device and/or the HMD. The fusion of the position data with the data collected by the IMU(s) may allow for tracking of the external device relative to the HMD.

19 Claims, 14 Drawing Sheets

(52) U.S. Cl.
CPC ............... *G02B 2027/014* (2013.01); *G02B 2027/0138* (2013.01); *G02B 2027/0178* (2013.01); *G02B 2027/0187* (2013.01)

(56) References Cited

U.S. PATENT DOCUMENTS

| | | | | |
|---|---|---|---|---|
| 8,550,915 | B2* | 10/2013 | Ashida | A63F 13/06 463/37 |
| 9,767,613 | B1* | 9/2017 | Bedikian | G06F 3/04845 |
| 10,102,674 | B2 | 10/2018 | Nartker et al. | |
| 10,678,324 | B2* | 6/2020 | Miller | G06F 3/011 |
| 2008/0318679 | A1* | 12/2008 | Tran | G01C 22/006 463/39 |
| 2012/0327194 | A1* | 12/2012 | Shiratori | G06F 3/011 348/47 |
| 2013/0188322 | A1* | 7/2013 | Lowe | A61B 5/0507 361/749 |
| 2014/0055352 | A1* | 2/2014 | Davis | G06F 3/0304 345/156 |
| 2014/0152558 | A1 | 6/2014 | Salter et al. | |
| 2015/0177825 | A1 | 6/2015 | Reponen et al. | |
| 2015/0258431 | A1* | 9/2015 | Stafford | A63F 13/5255 463/31 |
| 2015/0258432 | A1* | 9/2015 | Stafford | A63F 13/5255 463/32 |
| 2016/0093105 | A1* | 3/2016 | Rimon | G06T 11/60 345/633 |
| 2016/0169691 | A1 | 6/2016 | Kim | |
| 2016/0259404 | A1* | 9/2016 | Woods | G06F 3/017 |
| 2017/0011553 | A1 | 1/2017 | Chen et al. | |
| 2017/0076502 | A1 | 3/2017 | Kaeser et al. | |
| 2017/0244811 | A1 | 8/2017 | McKenzie et al. | |
| 2017/0365097 | A1* | 12/2017 | Lim | G06F 3/0488 |
| 2018/0158250 | A1* | 6/2018 | Yamamoto | G06T 19/20 |
| 2019/0012060 | A1 | 1/2019 | Moore et al. | |
| 2019/0033974 | A1* | 1/2019 | Mu | G06F 3/016 |
| 2019/0065026 | A1* | 2/2019 | Kiemele | G02B 27/0172 |
| 2019/0279428 | A1* | 9/2019 | Mack | A63F 13/211 |
| 2020/0133405 | A1* | 4/2020 | Chan | G06T 19/006 |
| 2020/0326544 | A1* | 10/2020 | Wan | G06F 3/0346 |
| 2021/0011556 | A1* | 1/2021 | Atlas | G02B 27/017 |

OTHER PUBLICATIONS

Lu, et al., "WatchAR: 6 DoF Tracked Watch for AR Interaction", 2019 IEEE International Symposium on Mixed and Augmented Reality, Sep. 2019, 2 pages.

International Search Report and Written Opinion for PCT Application No. PCT/US2021/071791, dated Feb. 7, 2022, 17 pages.

* cited by examiner

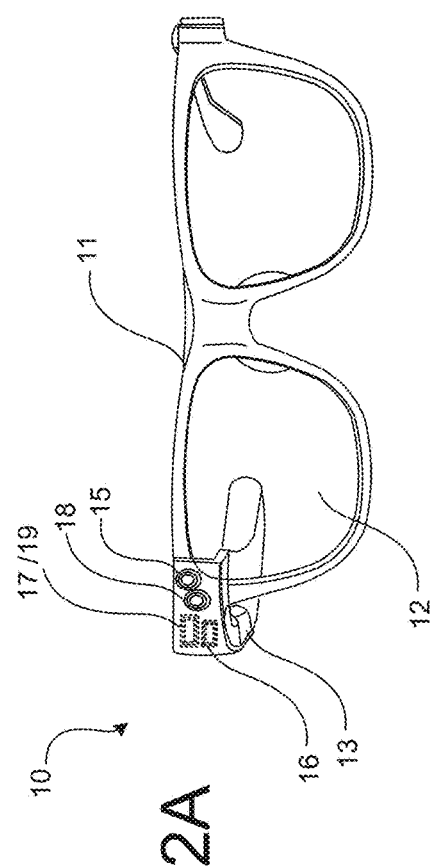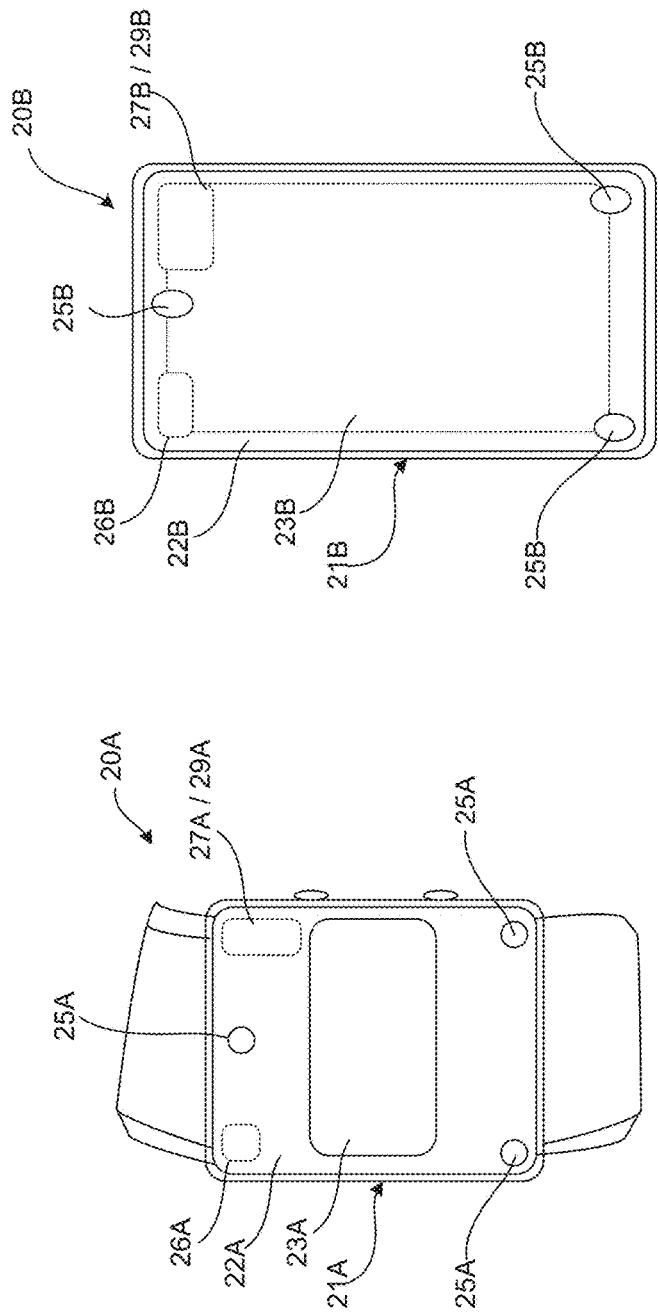

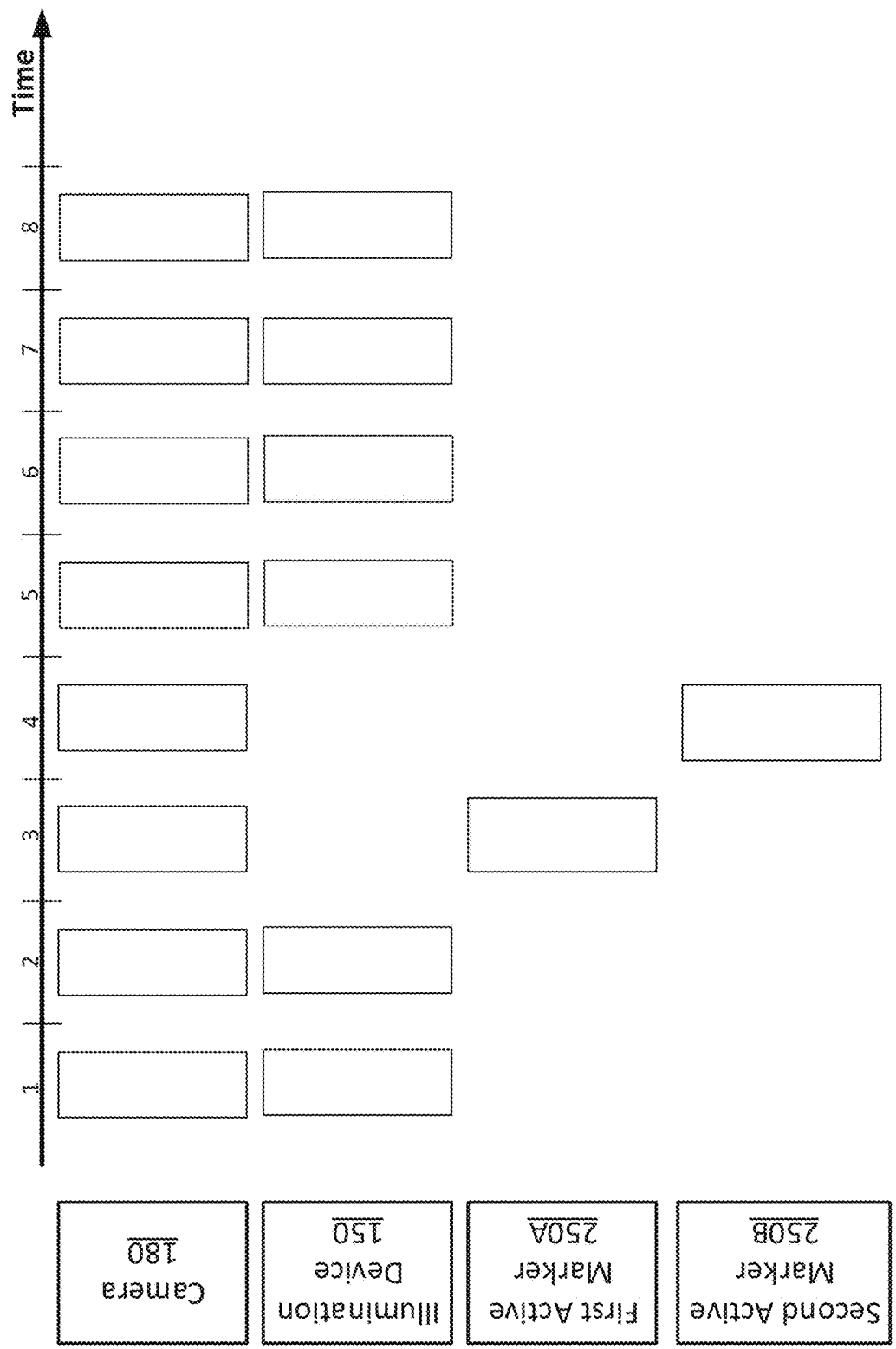

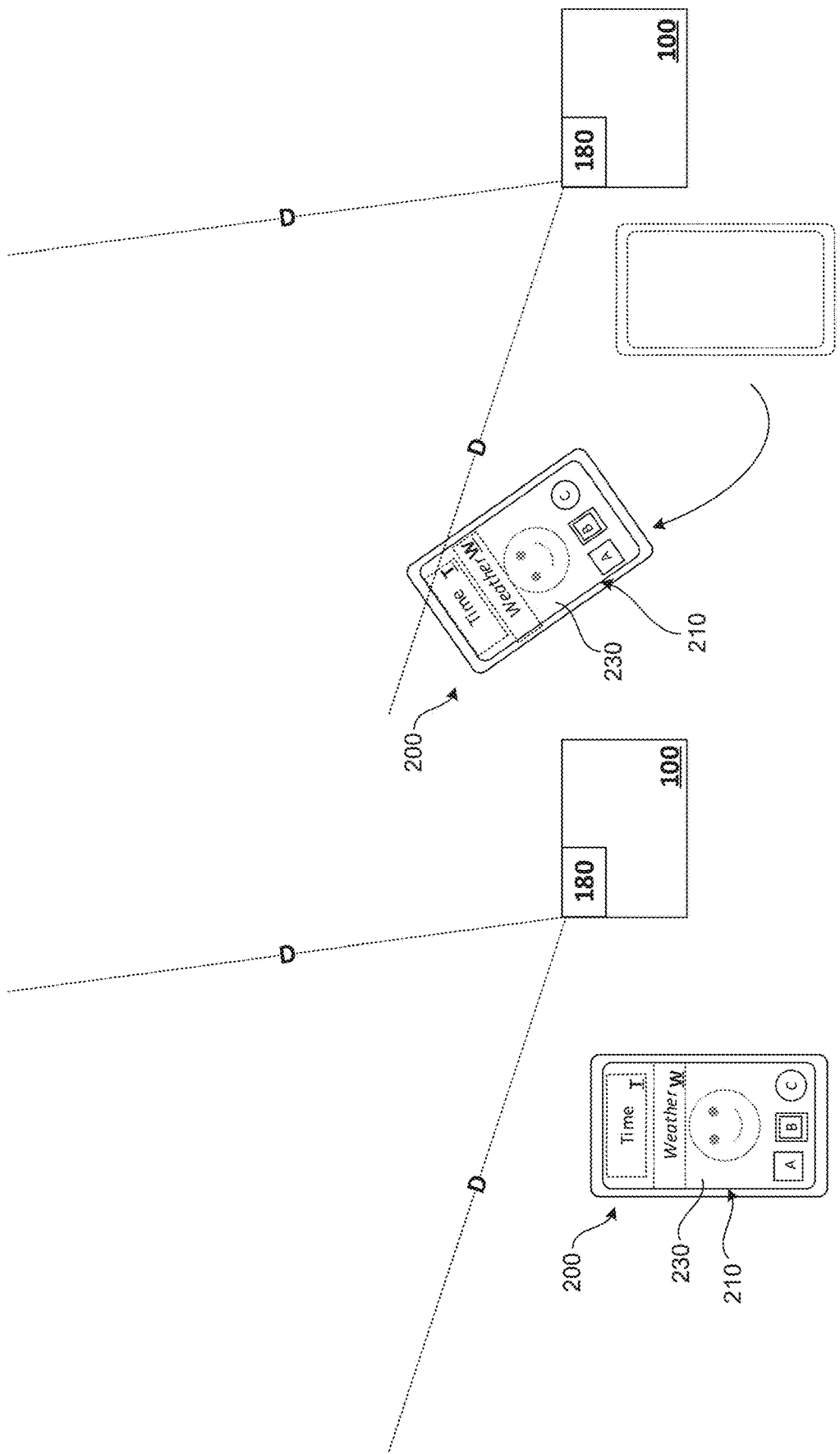

LOW-POWER SEMI-PASSIVE RELATIVE SIX-DEGREE-OF- FREEDOM TRACKING

CROSS-REFERENCE TO RELATED APPLICATION

This application is a continuation-in-part of, and claims priority to, International Patent Application No. PCT/US20/70057, filed on May 18, 2020, entitled "LOW-POWER SEMI-PASSIVE RELATIVE SIX-DEGREE-OF-FREEDOM TRACKING", the disclosure of which is incorporated by reference herein in its entirety.

FIELD

This relates, generally, to detection and tracking of an electronic device in an augmented and/or virtual reality environment.

BACKGROUND

Virtual reality (VR) systems, or augmented reality (AR) systems, or mixed reality (MR) systems, may make use of various different types of electronic devices to generate and present virtual content, to provide for user interaction with the virtual content, and the like. For example, a user may experience and interact with virtual content in a VR/AR/MR virtual environment through a head mounted device including a display, glasses or goggles, external electronic devices such as handheld devices, wrist worn devices, and other such electronic devices. Extended operation time of the electronic devices, particularly when using somewhat power constrained electronic devices for user interaction with the virtual content, may enhance the user experience.

SUMMARY

In one aspect, a system may include a head mounted display (HMD) configured to display virtual content. The HMD may include a display device, a camera, an illumination device, and a controller controlling operation of the HMD. The system may also include an input device operably coupled to the HMD. The input device may include an interface device, at least one active marker detectable by the camera of the HMD, at least one passive marker detectable by the camera of the HMD, and a controller controlling operation of the input device.

In some implementations, the at least one passive marker may include a retroreflective marker that is detectable by the camera of the HMD in response to illumination of the retroreflective marker by the illumination device of the HMD. In some implementations, the at least one active marker may include a first active marker at a first position on the input device, and a second active marker at a second position on the input device, and the at least one passive marker may include a retroreflective marker at a third position on the input device. In some implementations, the first active marker may include a light source that selectively emits light detected by the camera of the HMD, and the second active marker may include a light source that selectively emits light detected by the camera of the HMD.

In some implementations, an intensity of the light emitted by the light source of the first active marker may be different than an intensity of the light emitted by the light source of the second active marker. In some implementations, a pattern of the light emitted by the light source of the first active marker may be different than a pattern of the light emitted by the light source of the second active marker. In some implementations, when the input device is within a field of view of the camera of the HMD, the first active marker and the second active marker may be detectable by the camera, and the retroreflective marker may be detectable by the camera in response to illumination of the field of view of the camera by the illumination device.

In some implementations, the controller of the input device may be configured to control operation of the first active marker and the second active marker, and the controller of the input device may be configured to control operation of the illumination device during a block of operation time in which the input device is within the field of view, such that during at least one period within the block of operation time, the first active marker is on, and is detectable by the camera of the HMD, during at least one period within the block of operation time, the second active marker is on, and is detectable by the camera of the HMD, and during at least one period within the block of operation time, the illumination device is on, and the retroreflective marker is detectable by the camera of the HMD. In some implementations, during the at least one period in which the first active marker is on, the second active marker is off, and the illumination device is off. In some implementations, during the at least one period in which the second active marker is on, the first active marker is off, and the illumination device is off. In some implementations, during the at least one period in which the illumination device is on, the first active marker is off, and the second active marker is off.

In some implementations, the controller of the HMD may be configured to detect position data of the input device based on detection of the first active marker, the second active marker, and the passive marker, to combine the position data with at least one of acceleration data or orientation data received from the input device, and to determine a six-degree-of-freedom (6DOF) position of the input device relative to the HMD based on the combined position data and at least one of acceleration data or orientation data. In some implementations, the controller of the HMD may be configured to control operation of the display device to display the virtual content in an augmented reality environment, at a position corresponding to the determined 6DOF position of the input device.

In another general aspect, a computer-implemented method may include detecting, by a camera of a head mounted display (HMD), at least one active marker and at least one passive marker on an input device within a field of view of the camera, the input device being operably coupled to the HMD, detecting, by a processor of the HMD, position data of the input device based on the detection of the at least one active marker and the detection of the at least one passive marker, combining, by the processor, the detected position data with acceleration data and orientation data received from the input device, and determining, by the processor, a six-degree-of-freedom (6DOF) position of the input device relative to the HMD based on the combined position data, acceleration data and orientation data.

In some implementations, detecting the at least one active marker may include detecting a first active marker at a first position on the input device, and detecting a second active marker at a second position on the input device. In some implementations, detecting the at least one passive marker may include detecting a retroreflective marker at a third position on the input device. In some implementations, detecting the first active marker may include detecting light selectively emitted by a light source of the first active marker. In some implementations, detecting the second active marker may include detecting light selectively emitted by a light source of the second active marker. In some implementations, detecting the retroreflective marker may include detecting the retroreflective marker in response to illumination of the field of view of the camera by an illumination device of the HMD.

In some implementations, an intensity of the light emitted by the light source of the first active marker may be different than an intensity of the light emitted by the light source of the second active marker. In some implementations, a pattern of the light emitted by the light source of the first active marker may be different than a pattern of the light emitted by the light source of the second active marker. In some implementations, during a block of operation time in which the input device is within the field of view of the camera, detecting the first active marker, detecting the second active marker, and detecting the retroreflective marker may include detecting the first active marker during at least one period within the block of operation time when the first active marker is on and is detectable by the camera of the HMD, detecting the second active marker during at least one period within the block of operation time when the second active marker is on and is detectable by the camera of the HMD, and detecting the retroreflective marker during at least one period within the block of operation time when the illumination device is on and the passive marker is detectable by the camera of the HMD. In some implementations, detecting the first active marker may include detecting the first active marker during the at least one period in which the first active marker is on, the second active marker is off, and the illumination device is off. In some implementations, detecting the second active marker may include detecting the second active marker during the at least one period in which the second active marker is on, the first active marker is off, and the illumination device is off. In some implementations, detecting the retroreflective marker may include detecting the retroreflective marker during the at least one period in which the illumination device is on, the first active marker is off, and the second active marker is off.

In some implementations, the method may also include displaying, by a display device of the HMD, virtual content in an augmented reality environment, at a position corresponding to the determined 6DOF position of the input device.

In another general aspect, a non-transitory, computer-readable medium may have instructions stored thereon that, when executed by a computing device, cause the computing device to detect, by a camera of the computing device, at least one active marker and at least one passive marker on an input device that is within a field of view of the camera, the input device being in communication with the computing device, to detect, by a processor of the computing device, position data of the input device based on the detection of the at least one active marker and the detection of the at least one passive marker, to combining, by the processor, the detected position data with acceleration data and orientation data received from the input device, and to determine, by the processor, a six-degree-of-freedom (6DOF) position of the input device relative to the computing device based on the combined position data, acceleration data and orientation data.

In some implementations, in detecting the at least one active marker and the at least one passive retroreflective marker, the instructions may cause the computing device to detect a first active marker at a first position on the input device based on light emitted by a light source of the first active marker, to detect a second active marker at a second position on the input device based on light emitted by a light source of the second active marker, and to detect a retroreflective marker at a third position on the input device based on light, emitted by an illumination device of the computing device and reflected back to the camera by the retroreflective marker. In some implementations, during a block of operation time in which the input device is within the field of view of the camera of the computing device, in detecting the first active marker, detecting the second active marker, and detecting the retroreflective marker, the instructions may cause the computing device to detect the first active marker during a first period within the block of operation time when the first active marker is on and is detectable by the camera of the computing device, the second active marker is off, and the illumination device is off, to detect the second active marker during a second period within the block of operation time when the second active marker is on and is detectable by the camera of the computing device, the first active marker is off, and the illumination device is off, and to detect the retroreflective marker during at least one period within the block of operation time when the illumination device is on and the passive marker is detectable by the camera of the computing device, the first active marker is off, and the second active marker is off.

The details of one or more implementations are set forth in the accompanying drawings and the description below. Other features will be apparent from the description and drawings, and from the claims.

BRIEF DESCRIPTION OF THE DRAWINGS

FIG. 2A is a front view of an example head mounted display device, and FIGS. 2B and 2C are front views of example input devices, in accordance with implementations as described herein.

FIG. 5 is an example illumination pattern for the example system shown in FIG. 4, in accordance with implementations described herein.

FIGS. 9A-9D schematically illustrate movement of an example external device relative to an example head mounted display device, in accordance with implementations described herein.

DETAILED DESCRIPTION

A user may experience and interact with virtual content in an AR environment, or an MR environment, or a VR environment, using various electronic devices, such as, for example, a display device for experiencing the virtual content, and an external device, or an auxiliary device, or an input device, for interacting with the virtual content. Similarly, content available from the externa auxiliary/input device may be shared with the display device. For example, in some implementations, a head mounted display (HMD) device may generate and present the AR, or MR, or VR environment to the user. In some implementations, the HMD may be capable of receiving user input. However, in some instances, it may be difficult for the user to interact with virtual content through controls included in the HMD. Accordingly, in some implementations, an external device, or auxiliary device, or an input device may be operably coupled to the HMD, to facilitate user interaction with the virtual content. In some implementations, the external device, or auxiliary device, or input device may be a wearable device, such as, for example, a smart watch. In some implementations, the external device, or auxiliary device, or input device may be a handheld device, such as a smartphone, a handheld controller and the like. In some implementations, the external device, or auxiliary device, or input device may be another type of mobile electronic device, such as, for example, a tablet computing device, a laptop computing device and the like. In some implementations, the position and/or the orientation of the external device, or auxiliary device, or input device may be tracked, for example, tracked relative to the HMD to, for example, facilitate user interaction with the virtual content. Various different methods may be implemented in tracking the position and/or the orientation of the input device relative to the HMD. These various different methods may involve, for example, the exchange of sensor data between the input device and the HMD, the detection, by the HMD, of tracking devices, for example, active tracking device and/or passive tracking devices, on the input device, fiducial markers provided on and/or generated by the external device, and the like.

In some situations, the external auxiliary/input device may be somewhat power constrained due to, for example, a size and/or a capacity of a power storage device (i.e., a battery) of the external auxiliary/input device, other power requirements, and the like. In a situation in which the external auxiliary/input device is somewhat power constrained, it may be beneficial to reduce, or minimize the amount of power consumed in tracking the position and/or the orientation of external auxiliary/input device.

Figure 1:
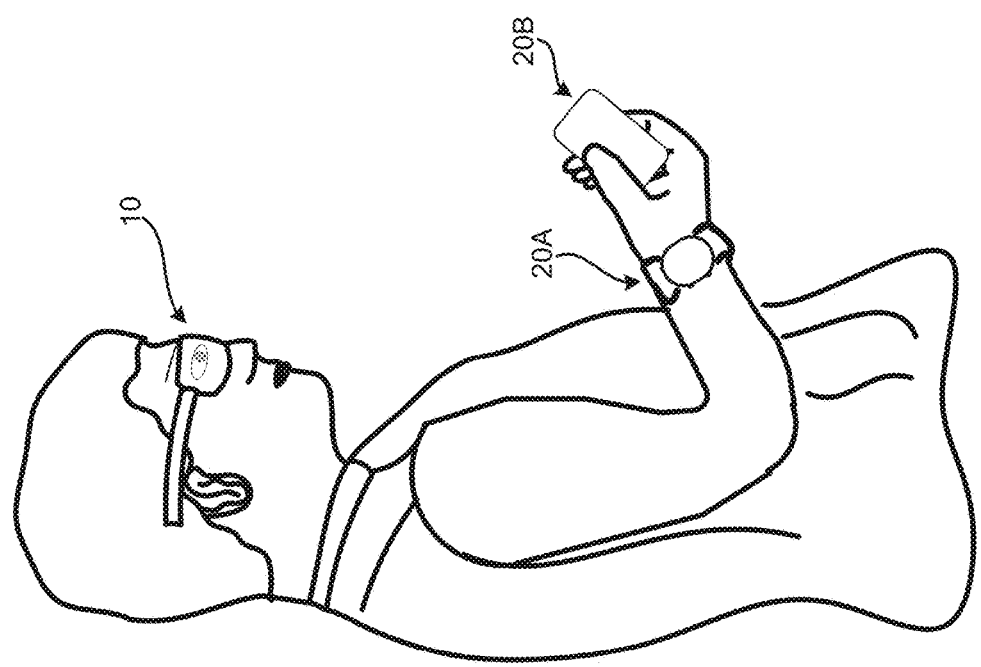
FIG. 1 is an example of a system including a head mounted display device and an input device, in accordance with implementations as described herein.

In the example implementation shown in FIG. 1, a user is wearing an example display device 10, for example, an example head-mounted display (HMD) device 10, with example external auxiliary/input devices 20 being operably couplable to the example HMD 10. The example HMD 10 may be, for example, example wearable smart glasses 10, or example goggles 10 that can provide for the display of virtual content to the user. In the example arrangement shown in FIG. 1, the HMD 10 is in the form of example smart glasses 10, simply for purposes of discussion and illustration. Examples of external auxiliary/input devices 20 include handheld devices, wearable input devices, wrist worn input devices, smart watches, and other such devices that can facilitate interaction with virtual content presented by the HMD 10, and/or that can share content with the HMD 10. The example arrangement shown in FIG. 1 includes a first external device 20A in the form of an example smart watch 20A, and a second external device 20B in the form of a smartphone 20B, simply for purposes of discussion and illustration. As discussed above, other electronic devices may be operably coupled to the example HMD 10.

FIG. 2A is a front view of the example HMD 10 worn by the user in FIG. 1. FIG. 2B is a front view of the first external device 20A shown in FIG. 1. FIG. 2C is a front view of the second external device 20B shown in FIG. 1.

The example HMD 10, in the form of example smart glasses 10 in this example, may include a frame 11, with a display device 12 coupled in the frame 11. In some implementations, an audio output device 13 may be coupled to the frame 11. The HMD 10 may include a sensing system 16 including various sensing system devices and a control system 17 including various control system devices to facilitate operation of the HMD 10. The control system 17 may include a processor 19 operably coupled to the components of the control system 17. The HMD 10 may also include an image sensor 18 (i.e., a camera 18). In some implementations, the image sensor 18, or camera 18 may be capable of capturing still and/or moving images. In some implementations, the image sensor 18, or camera 18, may be a depth camera that can collect data related to distances of external objects from the image sensor 18, or camera 18. In some implementations, the image sensor 18, or camera 18, may be a point tracking camera 18 that can, for example, detect and follow one or more optical markers on an external device, such as, for example, optical markers on the input device 20. In some implementations, the HMD 10 may include an illumination device 15 that may selectively operate, for example, with the image sensor 18, or camera 18, for detection of objects in the field of view of the image sensor 18, or camera 18.

The example external auxiliary/input device 20A in the form of a smart watch 20A, and the example external auxiliary/input device 20B in the form of a smartphone 20B, may include an interface device 21 (21A, 21B). In some implementations, the interface device 21 may function as an input device, including, for example, a touch surface 22 (22A, 22B) that can receive touch inputs from the user. In some implementations, the interface device 21 may function as an output device, including, for example, a display portion 23 (23A, 23B) allowing the interface device 21 to output information to the user. In some implementations, the interface device 21 can function as an input device and an output device. The auxiliary/input devices 20A, 20B may include a sensing system 26 (26A, 26B) including various sensing system devices. The auxiliary/input devices 20A, 20B may include a control system 27 (27A, 27B) including various control system devices and a processor 29 (29A, 29B), to facilitate operation of the external devices 20A, 20B. In some implementations, the external devices 20A, 20B may include a plurality of markers 25 (25A, 25B). The plurality of markers 25 may be detectable by the HMD 10, for example, by the image sensor 18, or camera 18, of the HMD 10, to provide data for the detection and tracking of the position and/or orientation of the external devices 20A, 20B relative to the HMD 10. In some implementations, the plurality of markers 25 may be active markers. Active markers may be substantially always detectable by the image sensor 18, or camera 18, of the HMD 10 when the active markers are enabled, or in an on state. In some implementations, the plurality of markers 25 may be passive markers, that are detectable by the image sensor 18, or camera 18, of the HMD 10 under preset conditions such as, for example, when illuminated by the illumination device 15 of the HMD 10. In some implementations, the plurality of markers 25 may include a combination of active markers and passive markers.

Figure 3:
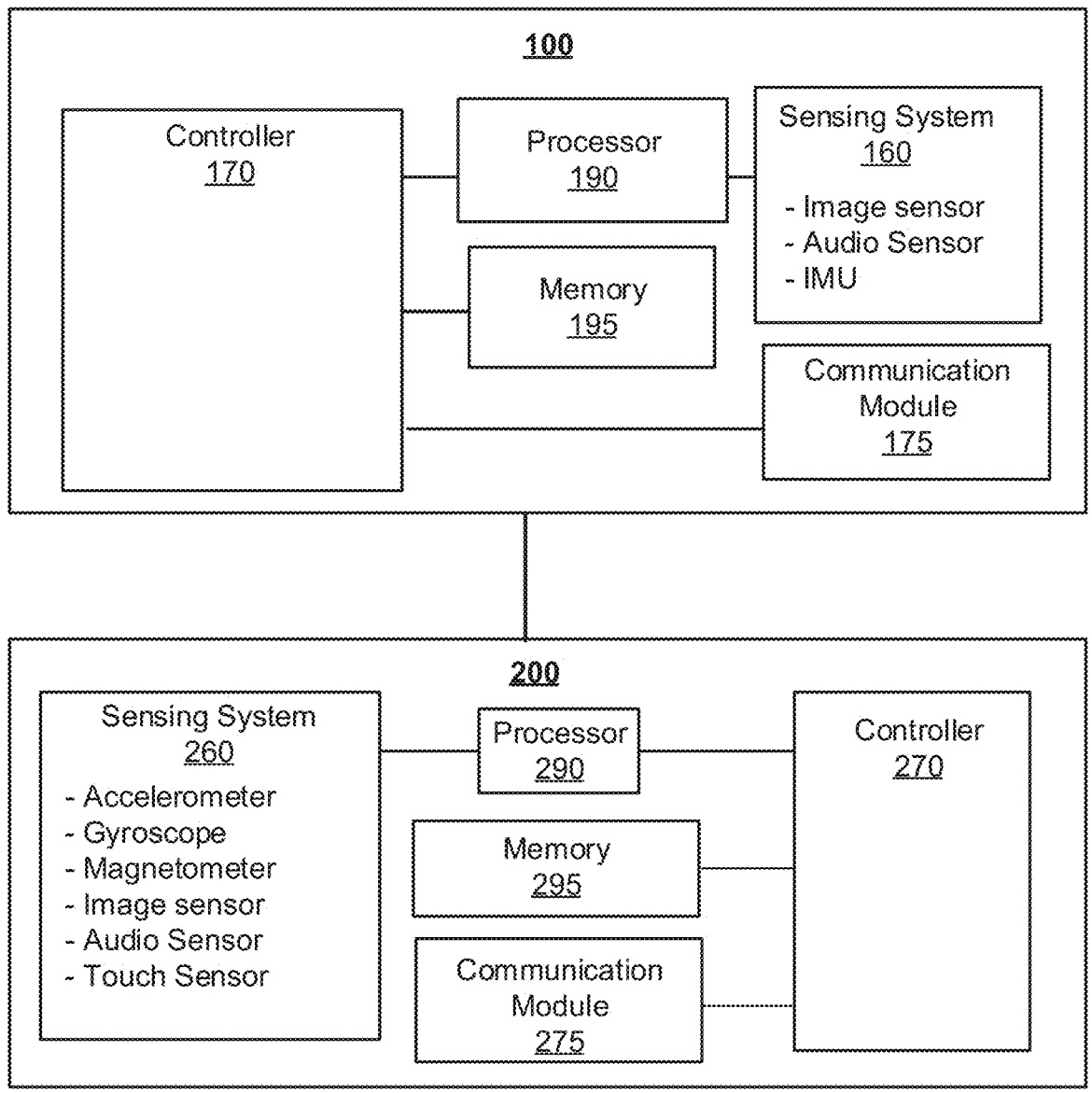
FIG. 3 is a block diagram of an example head mounted display device and an example input device, in accordance with implementations as described herein.

A block diagram of a relative tracking system, in accordance with implementations described herein, is shown in FIG. 3. The system may include a first user electronic device 100 in communication with a second user electronic device 200. The first electronic device 100 may be, for example an HMD such as, for example, the HMD as described above with respect to FIGS. 1 and 2A, that can display virtual content to the user. The second electronic device 200 may be, for example, an external device, or an auxiliary device, or an input device such as the external auxiliary/input devices described above with respect to FIGS. 1, 2B and 2C, that communicates with the HMD, facilitates user interaction with virtual content displayed by the HMD, shares content with the HMD and the like. The first electronic device 100 and the second electronic device 200 may communicate to exchange information. For example, the first electronic device 100 and the second electronic device 200 may be operably coupled, to facilitate communication via, for example, a wired connection, a wireless connection via for example, Wi-Fi or Bluetooth, or other type of connection.

The first electronic device 100 may include a sensing system 160 and a controller 170. In some implementations, the sensing system 160 and the controller 170 may be similar to (or the same as, or identical to) the sensing system 16 and the control system 17 described above with respect to FIGS. 1 and 2A. The sensing system 160 may include numerous different types of sensors, including, for example, an image sensor, or camera, an audio sensor, or microphone, position and/or orientation sensors such as, for example, an accelerometer, a gyroscope, a magnetometer and the like included in a inertial measurement unit (IMU) and the like, as well as other sensors and/or different combination(s) of sensors. The controller 170 may include numerous different types of devices, including, for example, a power/pause control device, image and audio control devices, as well as other such devices and/or different combination(s) of devices. In some implementations, the sensing system 160 and/or the controller 170 may include more, or fewer, devices, depending on a particular implementation.

The first electronic device 100 may include a processor 190 in communication with the sensing system 160 and the controller 170, a memory 195 accessible by, for example, a module of the control system 170, and a communication module 175 providing for communication between the first electronic device 100 and another, external device, such as, for example, the second electronic device 200. The controller 170 may control overall operation of the first electronic device 100, including operation of audio and/or video output components of the first electronic device 100 in response to inputs received via, for example, control devices of the controller 170 as described above, and/or inputs received from the second electronic device 200 via the communication module 175.

The second electronic device 200 may include a communication module 275 providing for communication between the second electronic device 200 and another, external device, such as, for example, the first electronic device 100 operably coupled to or paired with the second electronic device 200. The second electronic device 200 may include a sensing system 260 including a plurality of different sensors. For example, in some implementations, the sensing system 260 may include an IMU, the IMU including, for example, an accelerometer, a gyroscope, a magnetometer, and the like. In some implementations, the sensing system 260 may include, for example, an audio sensor, an image sensor, a touch sensor, as well as other sensors and/or different combination(s) of sensors. A processor 290 may be in communication with the sensing system 260 and a controller 270 of the second electronic device 200, the controller 270 accessing a memory 295 and controlling overall operation of the second electronic device 200. In some implementations, the sensing system 260 and the controller 270 may be similar to (or the same as, or identical to) the sensing system 26 and the control system 27 described above with respect to FIGS. 1, 2B and 2C.

As noted above, in an AR, or an MR, or a VR environment, the first electronic device 100 (i.e., an example HMD 100) may be operably coupled with the second electronic device 200 so that the user can interact with virtual content presented to the user by the first electronic device 100 using the second electronic device 200, can share content between the first and second electronic devices 100, 200 and the like.

Hereinafter, simply for ease of discussion and illustration, a system and method, in accordance with implementations described herein, will be described with respect to an augmented reality (AR) environment, in which a head mounted display device in the form of smart glasses is operably coupled with an auxiliary/input device in the form of a smart watch, for interaction with virtual content presented by the smart glasses in the AR environment. The concepts to be described in this manner are applicable to virtual reality (VR) environments and mixed reality (MR) environments, and/or with other combination(s) of electronic device(s) in use for presentation of and interaction with virtual content, sharing of content and the like.

Figure 4:
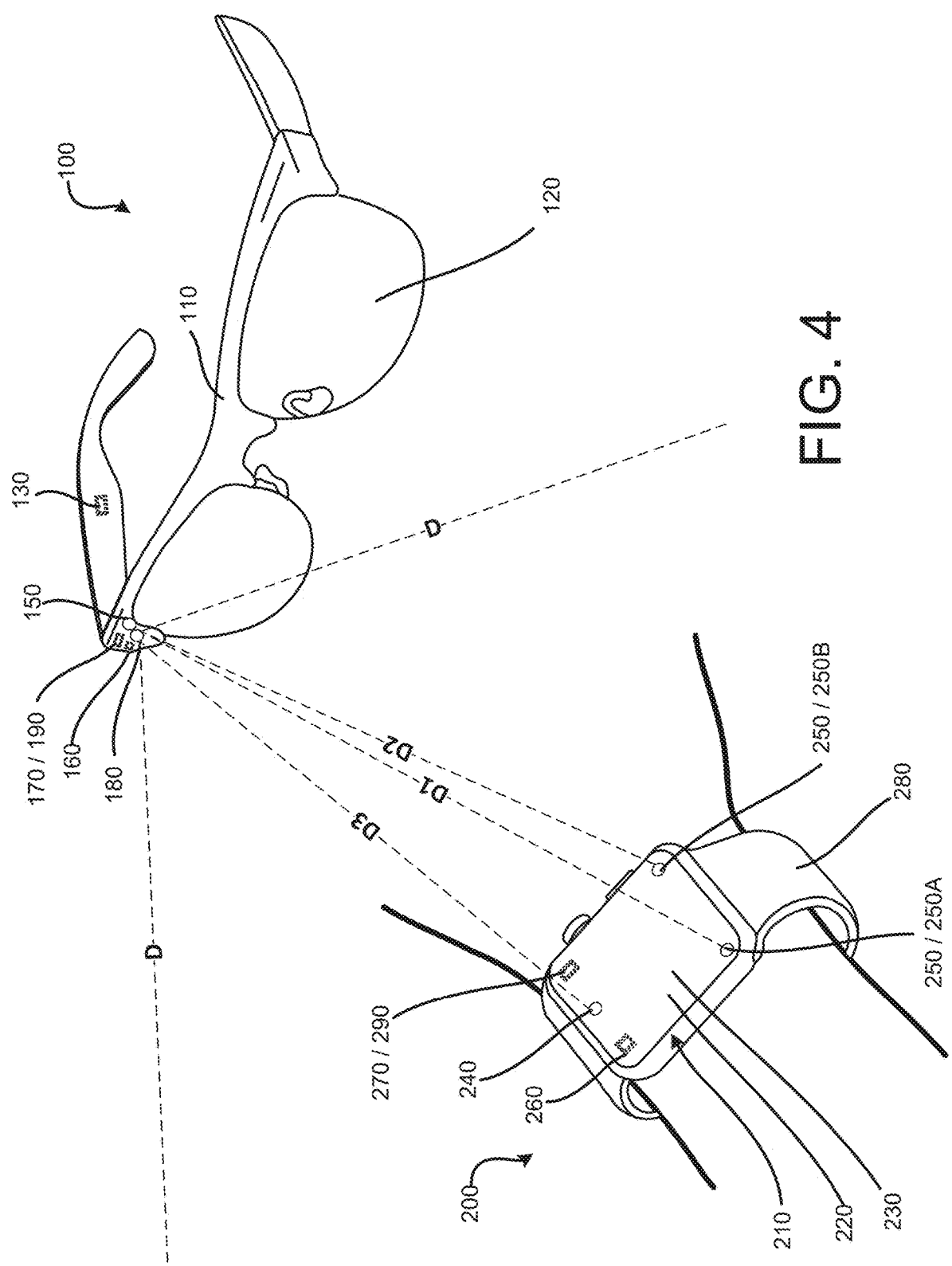
FIG. 4 illustrates a system including an example head mounted display device and an example input device, in accordance with implementations as described herein.

FIG. 4 illustrates an example HMD 100, in the form of smart glasses 100, operably coupled with an example external device 200, in the form of a smart watch 200, simply for purposes of discussion and illustration. The example HMD 100 and the example external device 200 may be operably coupled, so that a user may interact with virtual content presented by the HMD 100 using the external device 200. The position and/or the orientation of the external device 200, for example, relative to the HMD 100, may be detected and tracked to facilitate the use of the external device 200 for interaction with the virtual content presented by the HMD 100.

The example HMD 100 may include a display device 120 and an audio device 130 coupled in a frame 110. The HMD 100 may include a sensing system 160 including various sensing system devices as described above, a controller 170 including various control system devices as described above, and a processor 190 to facilitate operation of the HMD 100. The HMD 10 may also include an image sensor 180, or a camera 180, and an illumination device 150 that may selectively operate with the image sensor 180, or camera 180, to facilitate detection of objects within the field of view of the image sensor 180, or camera 180.

The example external device 200 may include an interface device 210 coupled to a band 280 that allows the input device 200 to be worn by the user. As described above, in some implementations, the interface device 210 may function as an input device, including, for example, a touch surface 220 that can receive touch inputs from the user. In some implementations, the interface device 210 may function as an output device, including, for example, a display portion 230 allowing the interface device 210 to output visual information to the user. In some implementations, the interface device 210 can function as both an input device and an output device. The external device 200 may include a sensing system 260 including various sensing system devices as described above, a controller 270 including various control system devices as described above, and a processor 290, to facilitate operation of the external device 200. In some implementations, the external device 200 may include a plurality of markers that are detectable by the HMD 100, for example, by the image sensor 180, or camera 180, of the HMD 100, when the external device 200 is within the field of view of the image sensor 180, or camera 180, to provide data for the detection and tracking of the position and/or orientation of the external device 200 relative to the HMD 100.

In some implementations, the plurality of markers may include a combination of passive markers 240 and active markers 250. In some implementations, active markers may be substantially always on, and thus substantially always detectable when the external device 200 is within the field of view of the image sensor 180, or camera 180, of the HMD 100. In some implementations, active markers may be periodically, or intermittently illuminated, so that the active markers are periodically, or intermittently detectable, for example, when in the field of view of the image sensor 180, or camera 180, of the HMD 100. Passive markers may be detectable under certain conditions when they are within the field of view of the image sensor 180, or camera 180 of the HMD 100. For example, passive markers may be detectable when illuminated by the illumination device 150 while within the field of view of the image sensor 180, or camera 180, of the HMD 100. Whether the active markers 250 are, essentially, always on, or periodically/intermittently on, power for the illumination of the active markers 250 is provided by the external device 200. Thus, an amount of power consumed at the external device 200 may be reduced by using a combination of active markers 250 and passive markers 240 when compared to, for example, an arrangement in which all, or only, active markers are used for tracking of the external device 200. A number and/or a combination of active marker(s) 250 and passive markers 240, and relative positioning of the active marker(s) 250 and passive markers 240, may be based on, for example, a known physical configuration of the external device 200, detectability of the markers 240, 250, and other such factors. In the example arrangement shown in FIG. 4, the example external device 200 includes one passive marker 240 and two active markers 250 (250A, 250B), with the interface device 210 having a substantially rectangular configuration, for purposes of discussion and illustration. In some implementations, other combinations of markers may be possible. For example, in some implementations, the external device 200 may include one active marker and two passive markers. In some implementations, other combinations of active markers and passive markers may be incorporated, depending, for example, on a configuration/size/shape of the external device, capabilities of the camera 180 of the HMD 100 in detecting the markers, power storage capacity of the external device 200, and other such factors, In the example system shown in FIG. 4, the sensing system 160 of the example HMD 100 may include an IMU as described above, and the sensing system 260 of the example external device 200 may include an IMU as described above. The respective IMUS may provide data that can be used to at least partially constrain the determination of the position and/or orientation of the external device 200, for example, the position/orientation of the external device 200 relative to the HMD 100. Data collected by the image sensor 180, or camera 180, directed toward a volume in which the user can move the external device 200, may be used to further constrain the determination of the relative position/orientation of the external device 200 and the HMD 100. For example, known points of correspondence between the external device 200 and the HMD 100 detected in the image captured by the camera 180 may further constrain the determination of the relative position of the external device 200 and the HMD 100.

In some implementations, the camera 180 of the HMD 100 may observe, or detect, or capture bright spots for example, in the form of markers as described above, within the field of view D of the camera 180, and/or within the volume in front of the user, and may detect positional information associated with the detected bright spots. Positional information collected in this manner may be used to further constrain the determination of the relative position/ orientation of the external device 200 and the HMD 100. In an arrangement in which the markers on the external device 200 are all active markers, the active markers may consume a relatively large amount of power in an already power constrained device. As noted above, it may be advantageous to reduce, or eliminate, the need for active markers for tracking the position of the external device 200 relative to the HMD 100, for the purpose of reducing power consumption for this purpose in the external device 200. In some implementations, a combination of a passive marker 240 and active markers 250, as in the example arrangement shown in FIG. 4, may provide for tracking of the position/orientation of the external device 200 relative to the HMD 100 in this manner, while conserving power.

In particular, as noted above, in the example arrangement shown in FIG. 4, the example external device 200 includes a first active marker 250A at a first location on the external device 200, a second active marker 250B at a second location on the external device 200, and a passive marker 240 at a third location on the external device 200. In some implementations, the passive marker 240 may be, for example, a passive retroreflective marker that does not consume power from the external device 200. Rather, light incident on the passive marker 240 (in the form of a retroreflective marker) may be reflected and directed toward the source of illumination. For example, when the external device 200 is within the field of view of the camera 180 of the HMD 100, light emitted by the illumination device 150 may cause the passive retroreflective marker 240 to reflect light back toward the illumination device 150 (and the camera 180 adjacent thereto) in the direction D3. In some implementations, the illumination device 150 may be positioned adjacent to the camera 180 of the HMD 100, so that the reflection of light from the passive retroreflective marker 240 is returned essentially back to the camera 180 adjacent to the illumination device 150. In some implementations, the illumination device 150 may be incorporated into the camera 180. In this manner, detection, by the camera 180 of the HMD 100, of the light reflected by the passive retroreflective marker 240 may allow the HMD 100 to identify the position of the passive retroreflective marker 240 relative to the HMD 100, which is in turn associated with the known third position on the external device 200.

As noted above, in the example arrangement shown in FIG. 4, the example external device 200 includes the first active marker 250A at the first location on the external device 200, and the second active marker 250B at the second location on the external device 200. The active markers 250 may include, for example, a light source such as, for example, a light emitting diode (LED). Light emitted by the first active marker 250A may be detected by the camera 180 along the direction D1, and the detected spot associated with the known first location on the external device 200. Similarly, light emitted by the second active marker 250B may be detected by the camera 180 along the direction D2, and the detected spot associated with the known second location on the external device 200. In some implementations, the active markers 250 may emit light in the infrared range, so that the light emitted by the active markers 250 is not visible to the user. In some implementations, each of the active markers 250A, 250B may emit light having certain characteristics that identify the specific active marker 250A, 250B for detection and processing by the camera 180/processor 190 of the HMD 100. For example, in some implementations, the first active marker 250A may emit light having a first intensity, that is different from the second active marker 250B emitting light having a second intensity, to distinguish the first active marker 250A from the second active marker 250B. In some implementations, the first active marker 250A may emit light having a first pattern, that is different from the second active marker 250B emitting light having a second pattern, to distinguish the first active marker 250A from the second active marker 250B. As described above, in some implementations, one or more of the active markers 250A, 250B may be substantially always in an on state, such that the active marker 250A, 250B is substantially always detectable by the camera 180 when the external device 200 is within the field of view of the camera 180, without the need for illumination provided by the illumination device 150. In some implementations, each of the active markers 250A, 250B may be periodically, or intermittently illuminated, for example, at set periods when the active markers 250 are in the known field of view of the camera 180 of the HMD 100, to conserve power in the external device 200. Detection, by the camera 180 of the HMD 100, of the light emitted by the active markers 250, may allow the HMD 100 to identify the position of the active markers 250 relative to the HMD 100, the first and second active markers 250A, 250B being associated with the known first and second positions, respectively, on the external device 200.

Using positional information determined based on the detection of the combination of markers 240, 250 by the camera 180 of the HMD 100, together with orientation/acceleration information received from the IMU, a six-degree-of-freedom (6DOF) position of the external device 200 relative to the HMD 100 may be tracked, to facilitate user interaction with virtual content. The 6DOF position of the external device 200 represents the coordinate position of the external device 200, as well as an orientation, or pose, of the external device 200 at that coordinate position. For example, movement of the external device 200 along the X, Y and Z axes, and rotation about the X, Y and Z axes corresponding to changes in orientation of the external device 200, may be tracked to yield the 6DOF position and orientation of the external device 200. In some implementations, data provided by the IMUs (for example, the IMU of the external device 200 and/or the IMU of the HMD 100) may be processed to constrain rotational degrees of freedom between the HMD 100 and the external device 200 (for example, at least two of the three rotational degrees of freedom). A position of the external device 200 may be derived, based on the known geometry, or arrangement, of the markers 240, 250 on the external device 200, and detection of the positioning of the markers 240, 250 within the field of view of the camera 180. Fusion of the rotational data provided by the IMU(s) with the positional data that can be obtained through detection of the combination of markers 240, 250 as described above may allow for the 6DOF tracking of the external device 200 relative to the HMD.

As noted above, in a power constrained external device, such as the example smart watch 200 shown in FIG. 4, the use of one or more passive retroreflective markers 240 at known position(s) on the external device 200 in combination with one or more active markers 250 at known positions on the external device 200, may provide a relatively low power solution to the problem of tracking the position of the external device 200 relative to the HMD 100 (i.e., 6DOF tracking of the external device 200 relative to the HMD 100). As noted above, in some implementations, the external device 200 may be controlled so that the active marker(s) 250 are only on when the external device 200 (and the active marker(s) 250) is within the field of view of the camera 180 of the HMD 100. In this manner, power consumed at the external device 200 to accomplish the 6DOF tracking of the external device 200 relative to the HMD 100 may be further reduced.

In some implementations, the HMD 100 may control operation of the illumination device 150 so that the illumination device 150 emits light in response to detection of the external device 200 within the field of view of the camera 180. In some implementations, the HMD 100 may control operation of the illumination device 150 so that the illumination device 150 emits light in anticipation of the external device 200 moving into the field of view of the camera 180 based on, for example, data received from the IMU(s), and a predicted movement direction and/or rate of the external device 200 based on the received IMU data. Similarly, in some implementations, the external device 200 may control operation of the first and second active markers 250A, 250B so that the active markers 250A, 250B emit light periodically, or intermittently, for example, when in a known field of view of the camera 180 of the HMD 100.

FIG. 5 is a chart of an example pattern of operation of the system within an example block of operation time, in accordance with implementations described herein. In this example temporal pattern for operation of the system within the example block of operation time, it may be assumed, for purposes of discussion and illustration, that the external device 200 is within the field of view of the camera 180, such that the external device 200, and the markers 240, 250 thereon, are detectable by the camera 180 of the HMD 100. In this example block of operation time, the camera 180 remains substantially always on during each period shown. During example periods 1 and 2, the illumination device 150 is in an on state, and a position of the (one or more) passive retroreflective marker(s) 240 may be detected based on light reflected back to the illumination device 150/camera 180. During example periods 3 and 4, the illumination device 150 is in an off state, and thus a position of the passive retroreflective marker 240 is not detected during periods 3 and 4. During example period 3, the first active marker 250A is in an on state (and the second active marker 250B is off), and a position of the first active marker 250A may be detected based on light detected between the first active marker 250A and the camera 180 (detectable along line of sight D1 between the camera 180 and the first active marker 250A). During example period 4, the second active marker 250B is in an on state (and the first active marker 250A is off), and a position of the second active marker 250B may be detected based on light detected between the second active marker 250B and the camera 180 (detectable along the line of sight D2 between the camera 180 and the second active marker 250B). During example periods 5, 6, 7 and 8, the illumination device 150 is once again in an on state, and updated positions of the (one or more) passive retroreflective marker(s) 240 may be detected based on light reflected back to the illumination device 150/camera 180. In FIG. 5, the example first active markers 250A is shown as illuminated only during example period 3, and the example second active marker 250B is shown as illuminated only during example period 4. However, in some implementations, the active markers 250A, 250B may substantially always be in the on state, or may be in the on state during more than periods 3 and 4 (whether or not the illumination device 150 is in the on state), to provide additional data for the determination of the position of the external device 200 during the relevant periods.

In some implementations, a common clock may be established between the external device 200 and the HMD 100. The common clock may be used to coordinate, or synchronize, a time at which the camera 180 records frames with a time at which the illumination device 150 is on (to facilitate detection of the passive retroreflective markers 250). Similarly, the common clock may be used to coordinate, or synchronize, a time at which the camera 180 records frames with a time at which the active markers 250 are illuminated. Synchronizing operation in accordance with a common clock in this manner may allow for synchronizing of the recording of the respective positions of the passive retroreflective marker(s) 240 and the active marker(s) 250. The reduction in active on time may further reduce power consumption, not only at the external device 200, but also at the HMD 100. In general, as frame recording time is decreased, intensity of the light (emitted by the active markers 250, and by the illumination device 150) may be increased (for the decreased frame recording time) to yield improved tracking data.

In some implementations, the passive retroreflective marker(s) 240 may be obscured at the surface of the external device 200, so that the passive retroreflective marker(s) 240 are not visible to the user, to improve the external appearance of the external device 200. For example, in some implementations, the passive retroreflective marker(s) 240 may be positioned behind a coating or layer that is visually opaque and transparent to infrared light, so that the passive retroreflective marker(s) 240 may be capable of reflecting light as described above, but are not visible to the user.

FIGS. 6A-6D illustrate the use of a system, such as the example system shown in FIG. 4, in accordance with implementations described herein. In FIGS. 6A-6D, the example system includes an example display device in the form of the example HMD 100, or smart glasses 100, described above, and an example external device in the form of the example smart watch 200 described above, simply for ease of discussion and illustration.

Figure 6A:
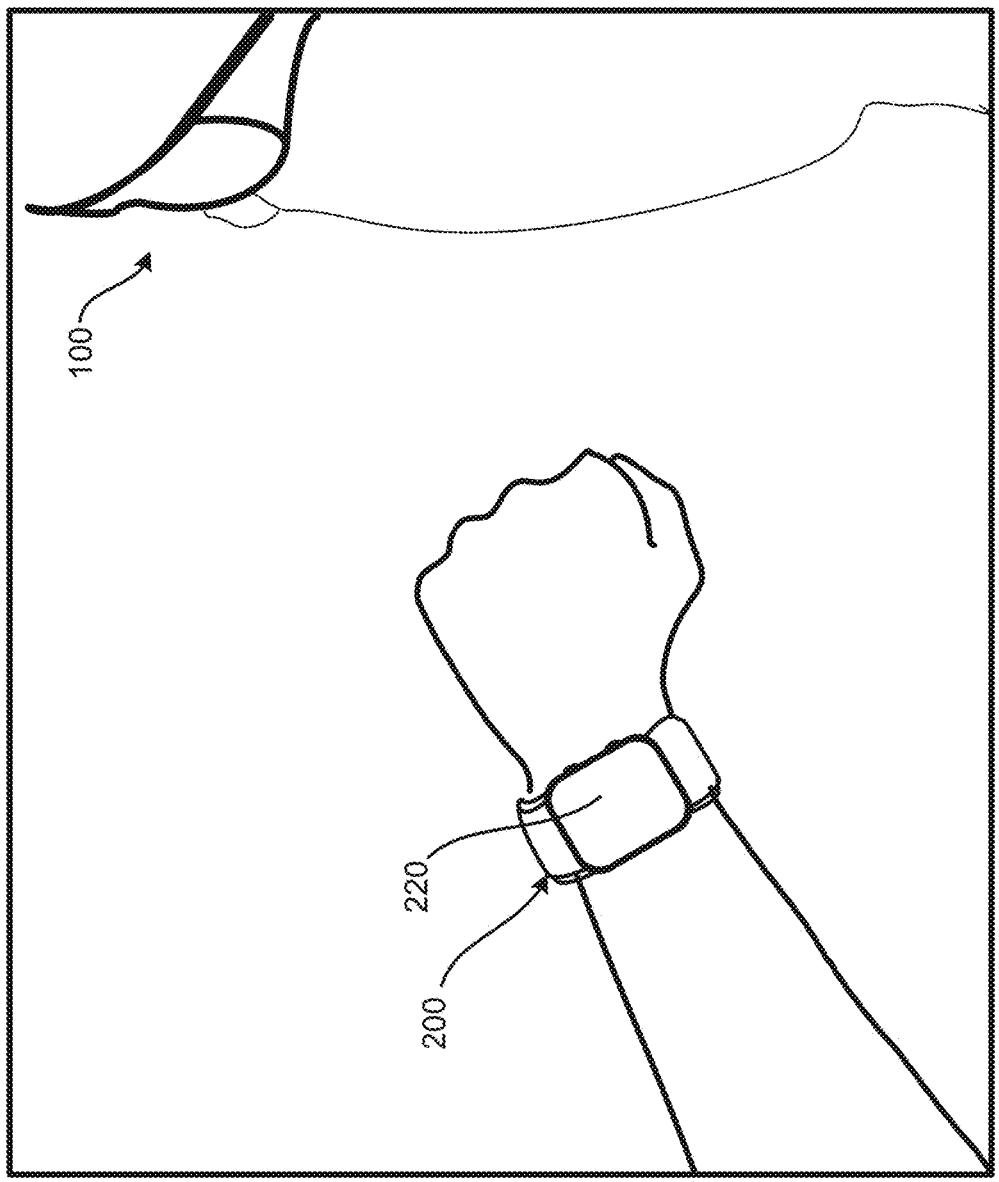
FIGS. 6A-6D illustrate an example use of the example system shown in FIG. 4, in accordance with implementations described herein.

As shown in FIG. 6A, a user may use the display device 100, or HMD 100, and the external device 200, or smart watch 200, to view and interact with virtual content displayed to the user by the HMD 100. For example, the user may issue a command to display virtual content. In some implementations, the user may issue the command through, for example, manipulation of a control device of the HMD 100 or a control device of the external device 200, a voice command issued to the HMD 100 or to the external device 200, a gesture command, and other such modes of implementing a command to display virtual content. In some implementations, tracking of the position and/or orientation of the external device 200 relative to the HMD 100 as described above may allow the virtual content displayed to the user by the HMD 100 to be attached to, or overlaid on, the external device 200. Display of virtual content to the user in a manner in which the virtual content appears to be floating in the field of view of the user may provide a somewhat unrealistic, and somewhat uncomfortable experience to the user, particularly when the user is to interact with the virtual content, using either the interface device 210 of the external device 200, gestures, and the like. Attachment of the displayed virtual content to the external device 200 in this manner may provide the user with a more anchored, and more realistic experience. Attachment of the displayed virtual content to the external device in this manner may facilitate interaction with the virtual content, particularly when the external device 200 is to be involved in the user's interaction with the virtual content.

Figure 6B:
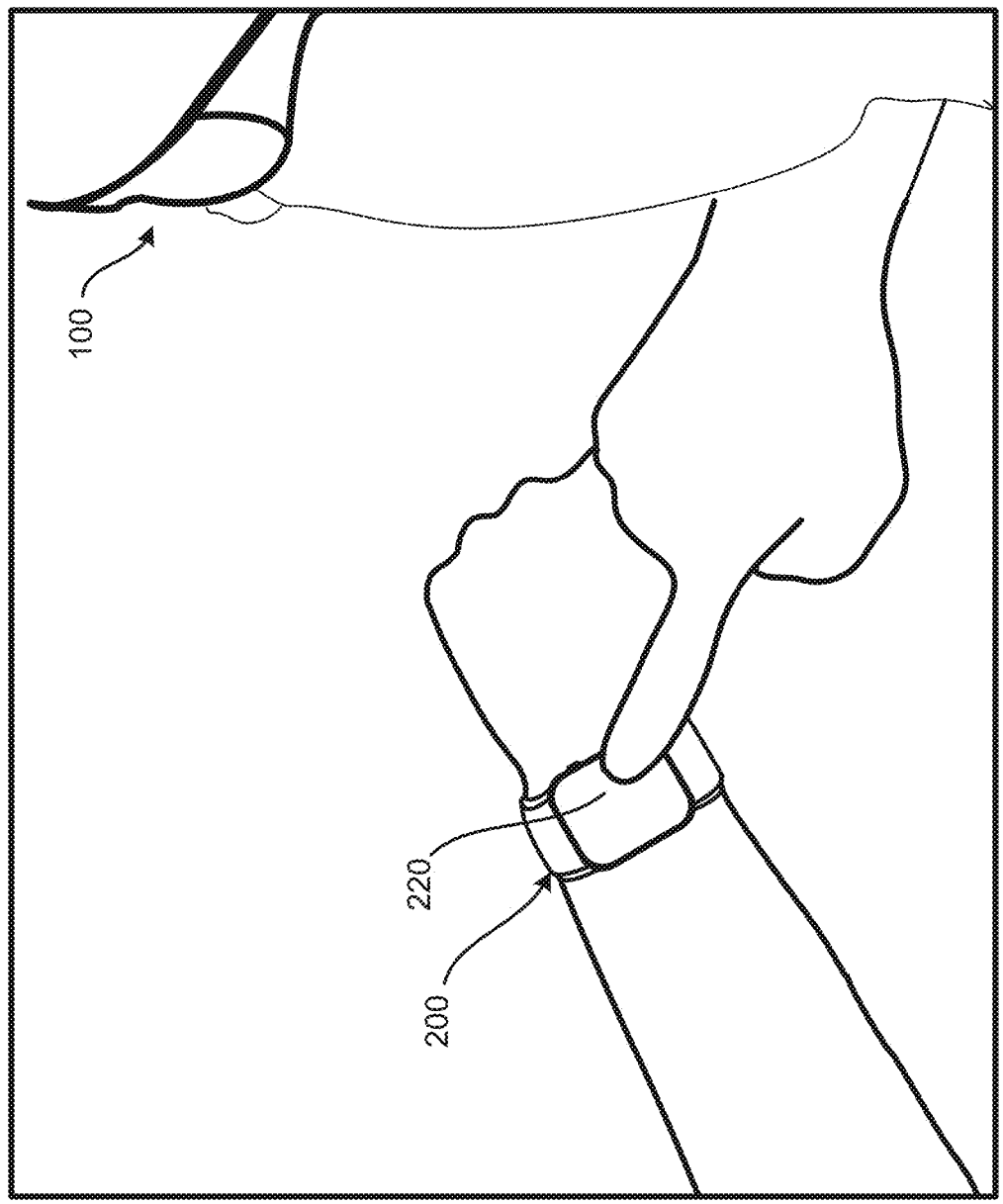

FIG. 6B illustrates user manipulation of the interface device 210 of the external device 200 to select virtual content to be displayed. In this example, the user externals a touch external on the touch surface 220 of the external device 200 to select the virtual content to be displayed, simply for purposes of discussion and illustration. However, as noted above, other types of user externals/commands may be implemented to select and cause virtual content to be displayed.

Figure 6C:
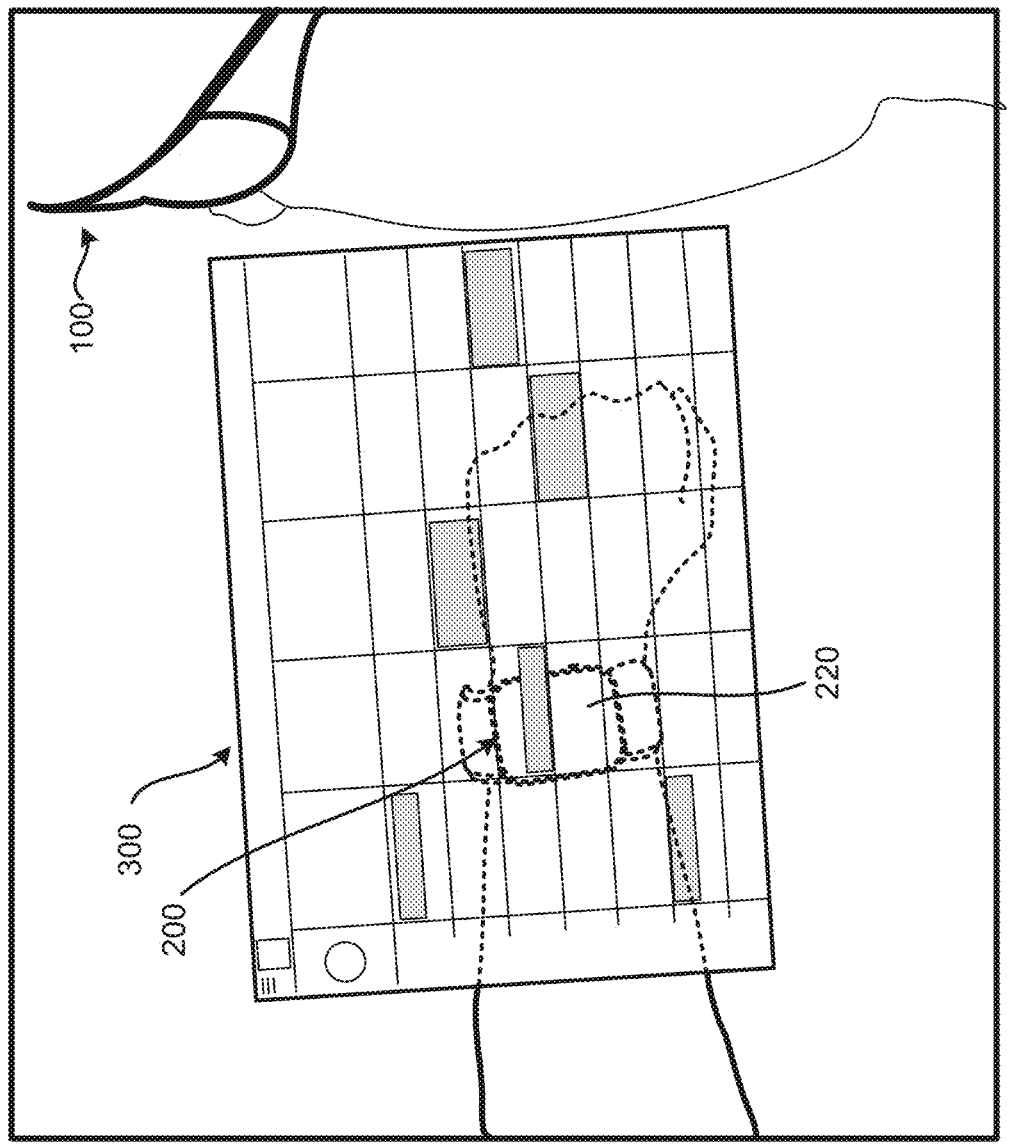
Figure 6D:
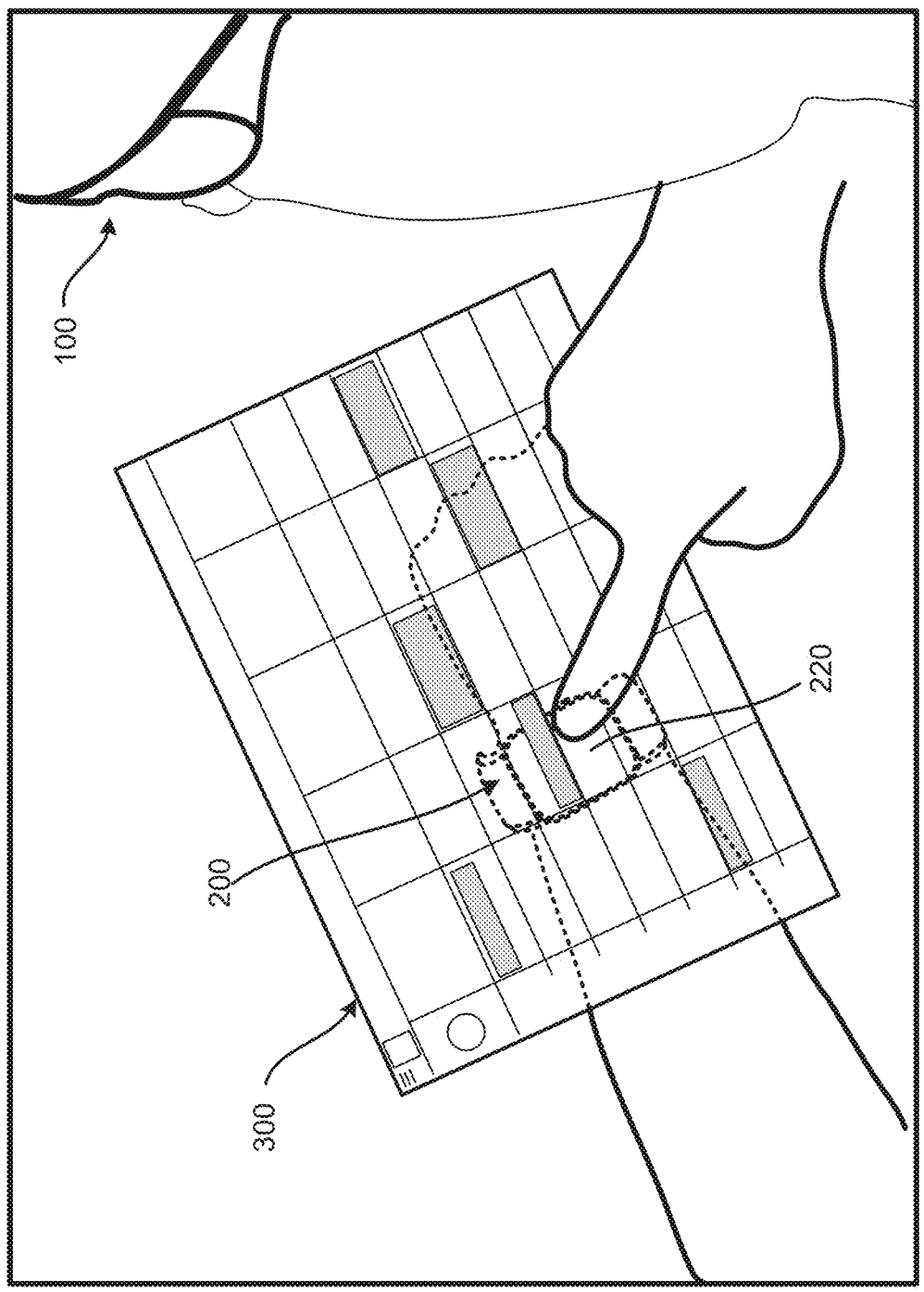

In response to user selection of virtual content to be displayed by the HMD 100, virtual content 300 may be displayed to the user by the HMD 100, as shown in FIG. 6C. In the example arrangement shown in FIG. 6C, the virtual content 300 is attached to, or aligned with, the external device 200, with the external device 200 at a first position/orientation. In the example arrangement shown in FIG. 6D, the user has moved the external device 200 to a second position/orientation, and the virtual content 300 has remained attached to the external device 200, and followed the external device 200 to the second position/orientation. In FIG. 6D, the user is interacting with the virtual content 300 through, for example, a touch input on the touch surface 220 of the external device 200. In some implementations, the user may interact with the virtual content 300 in other ways, such as, for example, voice commands, gesture commands, manipulation of other input mechanisms of the external device 200, manipulation of input mechanisms of the HMD 100, and the like. In some implementations, the virtual content 300 may be displayed to the user, for example, for information purposes, without further user input or interaction.

The example system including the example display device 100 and the example external device 200 as described above makes use of a combination of active and passive markers 240, 250, together with known placement and positioning on the external device 200, to provide data for tracking the 6DOF position of the external device 200 relative to the HMD 100. In some situations, the camera 180 may have difficulty distinguishing between individual passive markers (which are not capable of having different output intensities and/or output patterns as with the active markers). For example, in some situations, the geometry, or configuration, of the external device 200 may be relatively small, such as the interface device 210 of the example external device 200 in the form of the example smart watch described above. In this example, due to the size/configuration of the external device 200, multiple inactive markers would necessarily be relatively close together, and difficult to distinguish from each other, particularly when the external device 200 is moving within the volume in front of the user. Thus, one or more active markers may be used to establish a frame of reference for the relative geometry of the interface device 210 of the external device 200 and relative positioning of the markers 240, 250.

Figure 7:
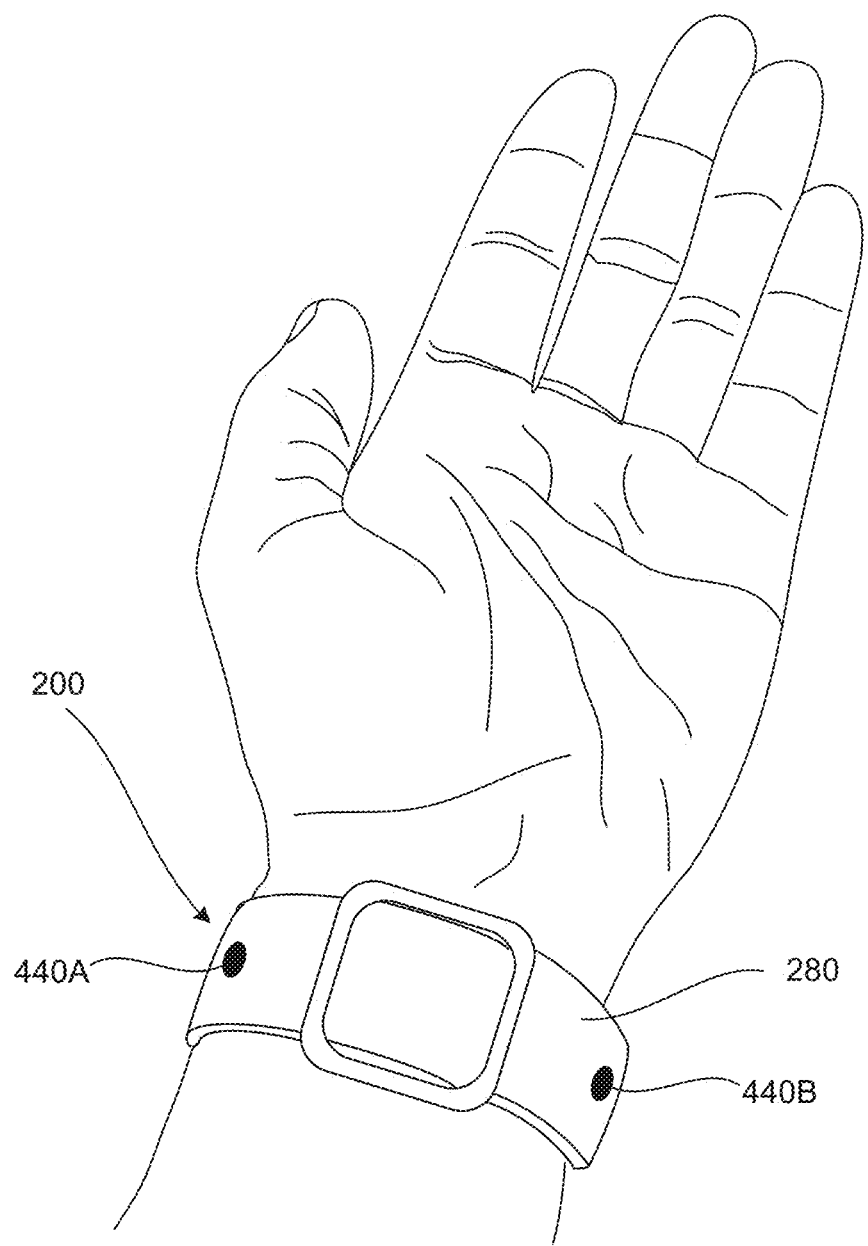
FIG. 7 is a bottom/rear view of a band portion of an example input device, in accordance with implementations described herein.

An implementation in which the example external device 200, in the form of the example smart watch 200, includes a first passive retroreflective marker 440A and a second passive retroreflective marker 440B on a rear facing side of the band 280 of the external device 200, is shown in FIG. 7.

In the example arrangement show in FIG. 7, a distance between the first passive retroreflective marker 440A and the second passive retroreflective marker 440B may be great enough for the camera 180 of the HMD 100 to distinguish between the bright spots and reflection from the first and second retroreflective markers 440A, 440B in response to the light emitted by the illumination device 150. In this arrangement, the display of virtual content may, for example, be anchored, or attached to the palm of the user (as the interface device 210 of the external device 200 may be somewhat inaccessible to the user for input in this orientation). In some implementations, in which the HMD 100 is capable of gesture recognition, the user may interact with the virtual content using hand gestures. In some implementations, detection of the first and second passive retroreflective markers 440A, 440B in the orientation shown in FIG. 7 may indicate a mode switch.

Figure 8:
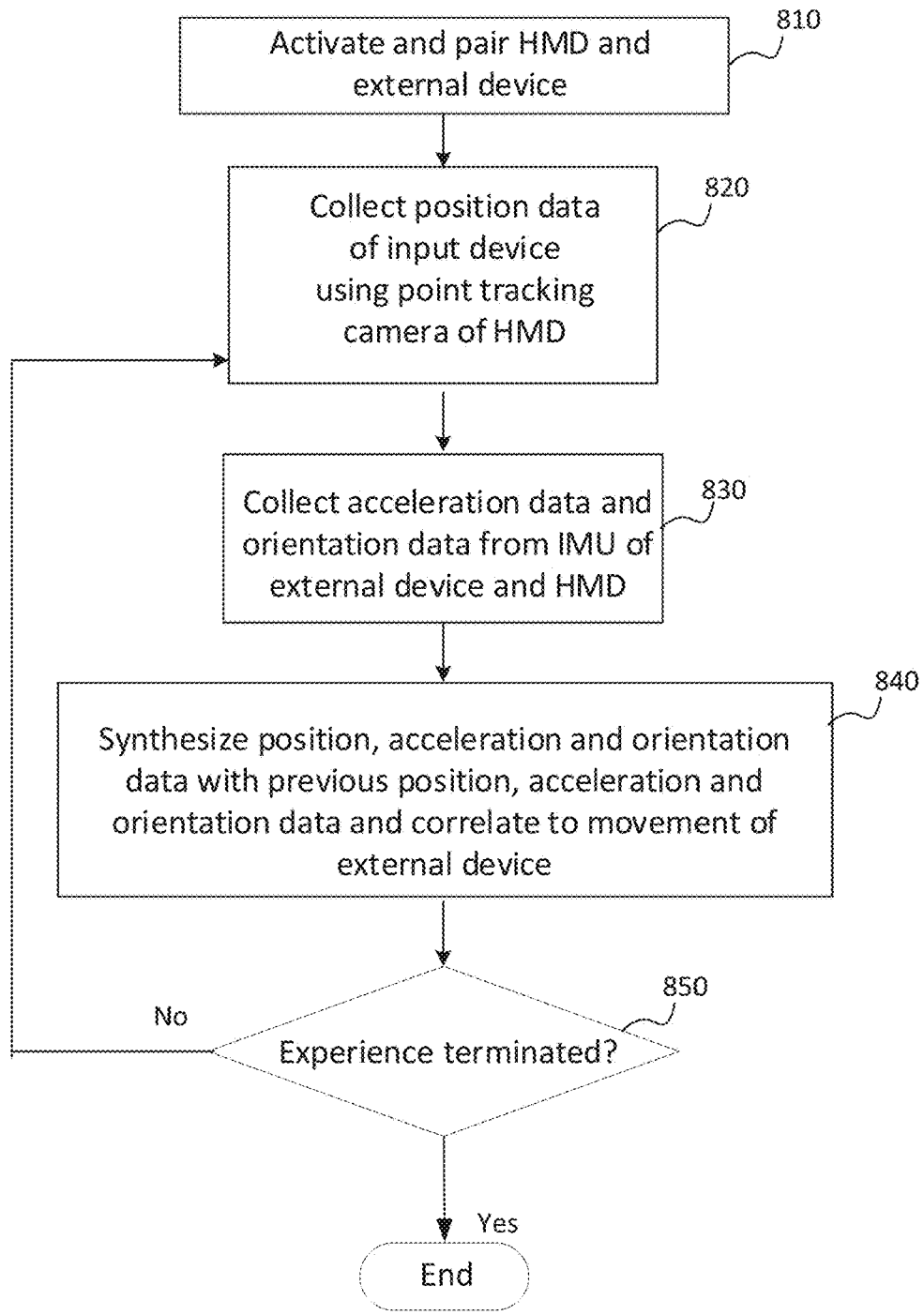
FIG. 8 is a flowchart of a method of tracking an input device relative to an HMD, in accordance with implementations as described herein.

A method 800 of tracking an external auxiliary/input device relative to a head mounted display (HMD) device, in accordance with implementations as described herein, is shown in FIG. 8. As noted above, the external device may be, for example, the example smart watch 200 shown in FIG. 4, or other type of device that can be operably coupled with the HMD. The HMD may be, for example, the example smart glasses 100 shown in FIG. 4, or other type of display device that can display virtual content to the user. After the HMD and the external device have been activated and paired (block 810), position data of the external device relative to the HMD may be collected by the point tracking camera of the HMD (block 820). As described in detail above, collection of data by the point tracking camera of the HMD may include, for example, detection of a combination of active markers and passive markers, and respective positions on the external device associated respectively therewith. Detection of the positional information of the external device may be carried out while the external device is within the field of view of the point tracking camera. Detection of passive markers, and associated positions on the external device, may be carried out together with the operation of an illumination device of the HMD, as shown in FIG. 5. Acceleration data and orientation data may be collected from an IMU of the external device and/or from an IMU of the HMD be collected (block 830). Data synthesis may be carried out by the HMD and the external device to track the position and movement of the external device. For example, the position data collected by the point tracking camera of the HMD and the acceleration and/or orientation data collected by the IMU(s) may be substantially continuously collected and processed. Position and movement and/or orientation data taken at a current point in time may be compared to position and movement and/or orientation data at the previous point in time, to determine a movement trajectory that is continuously updated as data is continuously collected, processed and/or synthesized (block 840). The tracking of the position and orientation of the external device relative to the HMD may be used to, for example, attach virtual content to the external device, as described above with respect to FIGS. 6A-6D. This process may be repeatedly performed until it is determined that the experience has been terminated (block 850).

As noted above, In some implementations, the HMD 100 may detect and/or locate the external device(s) 200 in response to detection of one or more fiducial markers, or reference markers of the external device 200. In some implementations, the fiducial marker(s), or reference marker(s) may be generated by the external device 200. In some implementations, the external device 200 may generate a fiducial marker, for example, in response to the external device 200 moving into the field of view D of the camera 180 of the HMD 100. In some implementations, the fiducial marker(s) can be used to detect entry of the external device 200 into the field of view D of the camera 180 of the HMD 100, establish a location of the external device 200 and the like, with other tracking methods, such as, for example, the methods described above, tracking the 6DOF position of the external device 200 once the device 200 is detected/located. In some implementations, the system can continue to rely on the fiducial marker(s) to perform 6DOF tracking of the external device 200 relative to the HMD 100. In some implementations, the fiducial marker(s) are specifically generated to facilitate the detection and/or location and/or tracking of the external device 200. In some implementations, the fiducial marker(s) include known characteristics of the external device 200 such as, for example, screen state of the external device 200, without generating fiducial markers specific for detection and/or location and/or tracking of the external device 200.

FIGS. 9A-9D schematically illustrate the detection and/or location of an example external device 200 based on detection of a fiducial marker, in accordance with implementations described herein. In the example shown in FIGS. 9A-9D, the external device 200 is in the form of a handheld device, or smartphone, simply for purposes of discussion and illustration. The principles to be described herein may be applied to other types of external devices, such as, for example, the smart watch described above and other such devices which may communicate with the HMD 100.

As noted above, in this example, the external device 200 and the HMD 100 are operably coupled, or paired, to provide for communication and interaction between the external device 200 and the HMD 100. In this example, various items are displayed on the display portion 230 of the interface device 210 of the external device 200. In the example arrangement shown in FIG. 9A, a Time widget T, a Weather widget W, a first icon A representing a first application, a second icon B representing a second application, and a third icon C representing a third application are displayed on the display portion 230 of the external device 200.

Figure 9D:
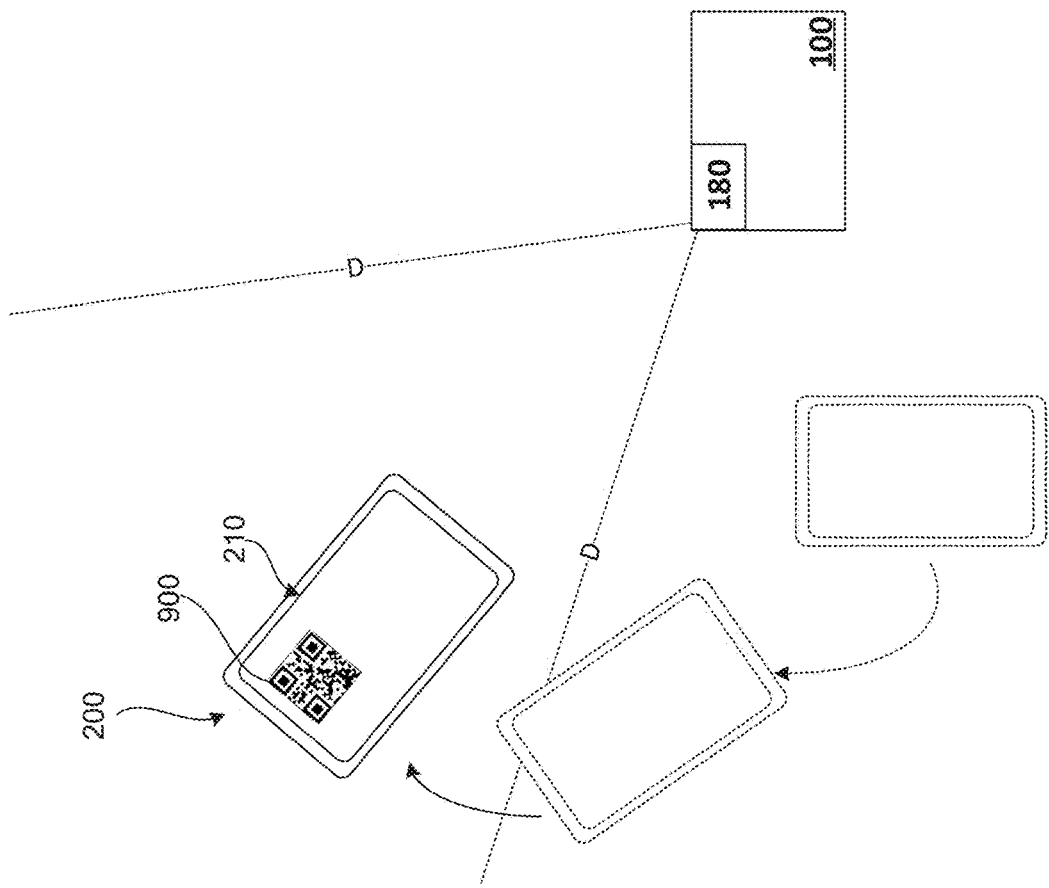
Figure 9C:
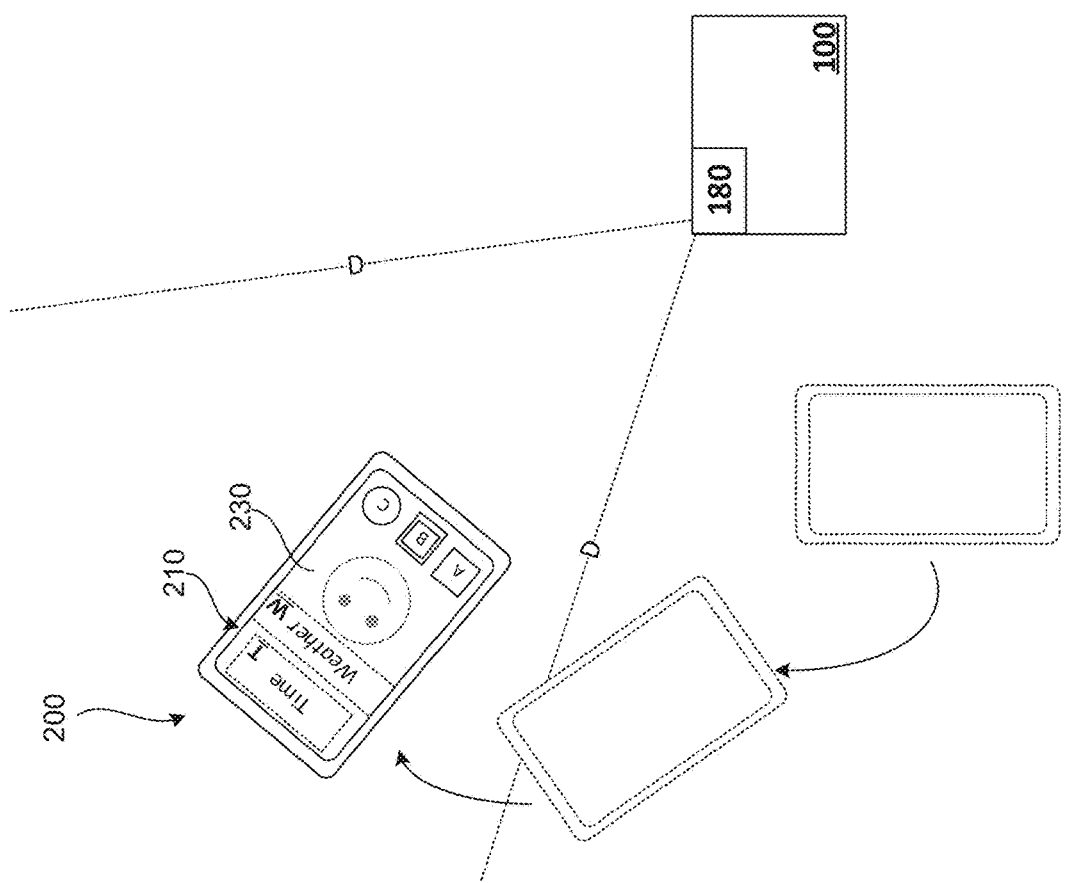

In FIG. 9A, the external device 200 is outside of the field of view D of the camera 180 of the HMD 100. In FIGS. 9B and 9C, the user has moved the external device 200 towards, and into the field of view D of the camera 180 of the HMD 100.

In some implementations, in an operably coupled or paired state of the external device 200 and the HMD 100, the screen state of the external device 200, which is known to the HMD 100 in the paired state, may define a fiducial marker which can be used to detect and/or locate and/or track the external device 200 in the field of view D of the camera 180 of the HMD 100. For example, in some implementations, one or more of the widgets T and W and the icons A, B, and C representing the applications and/or their respective locations on the display portion 230 of the external device 200, may define one or more fiducial markers. In some implementations, the screen state as a whole, including both of the widgets T and W together with the three icons A, B and C, may together define a fiducial marker.

As the external device 200 moves into the field of view of the camera 180, as shown in FIG. 9C, the camera 180 may detect the one or more fiducial marker(s) defined by the screen state of the external device 200. In response to the detection of the fiducial marker(s) in this manner, the system may detect/recognize and/or locate the external device 200, and may track the 6DOF position of the external device using the fiducial marker(s), or a tracking method as described above with respect to FIGS. 4-6D, or other method of tracking the 6DOF position of the external device 200 relative to the HMD 100.

In some implementations, in which the camera 180 is substantially always on, the camera 180 substantially continuously scans for and can detect the one or more fiducial markers as the external device 200 is moved into the field of view of the camera 180 of the HMD 100. In some implementations, the movement of the external device 200, from the position shown in FIG. 9A to the position shown in FIG. 9C, and the corresponding change in orientation of the external device 200, may define a gestural command. In some implementations, this type of gestural command may trigger the camera 180 of the HMD 100 to scan for the external device 200 (for example, in a situation in which the camera 180 is idle).

In some implementations, this type of gestural command may define a wake up gesture that triggers the external device 200 to generate a fiducial marker. For example, in a situation in which the external device 200 is in an idle state, with little to nothing displayed on the display portion 230, this type of gestural command may trigger the external device 200 to display the last screen state (which would be known to both the external device 200 and the HMD 100 in the paired state). In some implementations, this type of gestural command may trigger the external device 200 to display a fiducial marker 900 that is specific to detection and tracking of the external device 200, as shown in FIG. 9D. The example fiducial marker 900 shown in FIG. 9D is a quick response (QR) code, simply for purposes of discussion and illustration. Other types of fiducial markers may be generated and displayed in a similar manner, including user generated and stored fiducial markers. In some implementations, the gestural command can trigger the display of the fiducial marker 900 shown in FIG. 9D from an idle screen state. In some implementations, the fiducial marker 900 shown in FIG. 9D can be generated and displayed from an active screen state (for example, including the widgets T and W and the icons A, B and C) to, for example, facilitate detection and tracking of the external device 200.

In some implementations, a fiducial marker associated with the external device 200 may be defined by a known outer peripheral contour of the external device 200. For example, in the operably coupled/paired state, a gestural command as described above may trigger the camera 180 of the HMD 100 to detect/recognize the external device 200 within the field of view of the camera 180 based on the detected outer peripheral contour of the external device 200.

Figure 10:
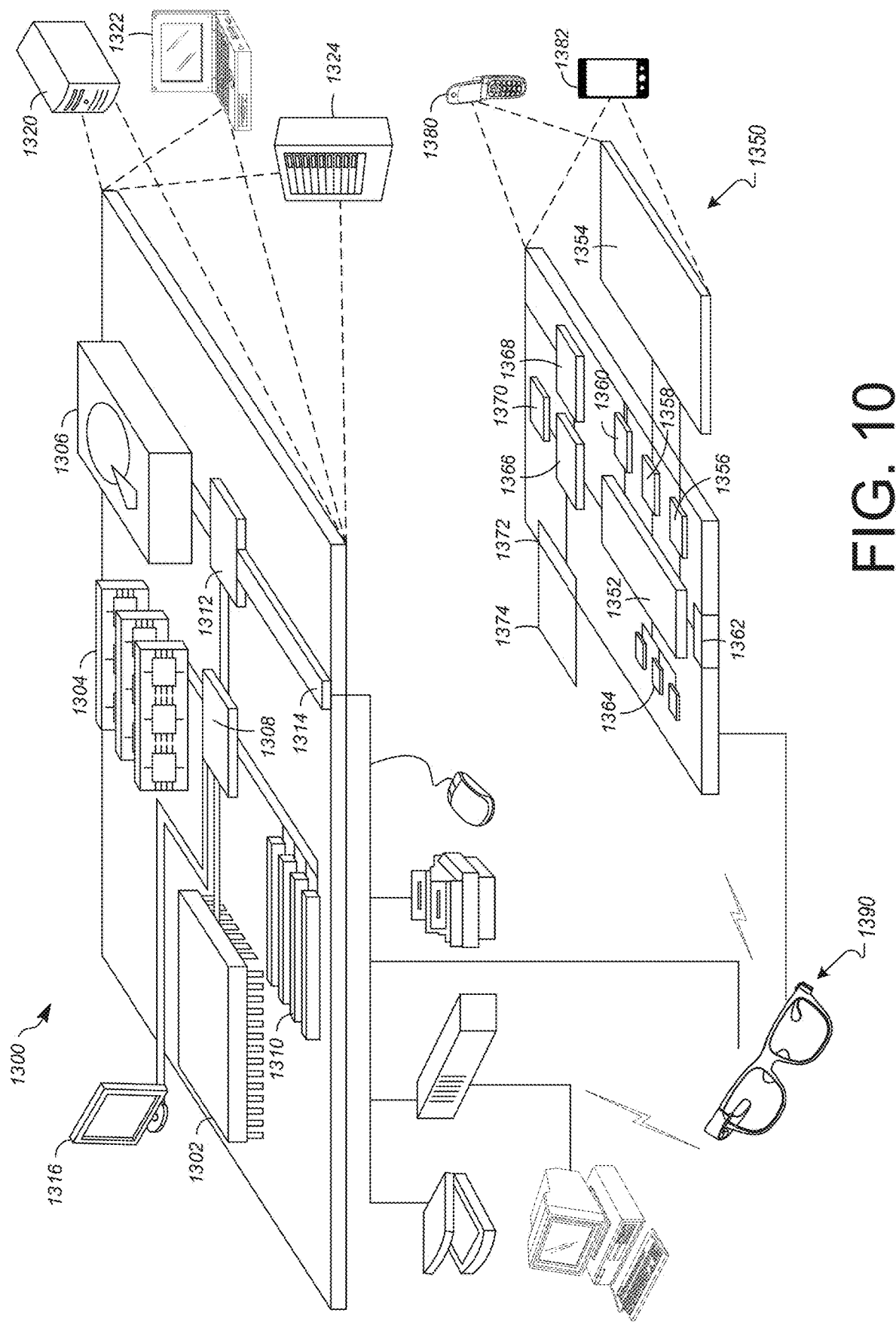
FIG. 10 illustrates an example of a computing device and a mobile computing device that can be used to implement the techniques described herein.

FIG. 10 illustrates an example of a computer device 1300 and a mobile computer device 1350, which may be used with the techniques described here. The computing device 1300 includes a processor 1302, memory 1304, a storage device 1306, a high-speed interface 1308 connecting to memory 1304 and high-speed expansion ports 1310, and a low-speed interface 1312 connecting to low-speed bus 1314 and storage device 1306. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high-speed interface 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, or memory on processor 1302.

The high-speed controller 1308 manages bandwidth-intensive operations for the computing device 1300, while the low-speed controller 1312 manages lower bandwidth-intensive operations. Such allocation of functions is example only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT LCD (Thin-Film-Transistor Liquid Crystal Display), and LED (Light Emitting Diode) or an OLED (Organic Light Emitting Diode) display, or other appropriate display technology. The display interface 1356 may include appropriate circuitry for driving the display 1354 to present graphical and other information to a user. The control interface 1358 may receive commands from a user and convert them for submission to the processor 1352. In addition, an external interface 1362 may be provided in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In-Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provided as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352, that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, Wi-Fi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smartphone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted can include sensors that interface with an AR headset/HMD device 1390 to generate an augmented environment for viewing inserted content within the physical space. For example, one or more sensors included on a computing device 1350 or other computing device depicted, can provide input to the AR headset 1390 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1350 can use the sensors to determine an absolute position and/or a detected rotation of the computing device in the AR space that can then be used as input to the AR space. For example, the computing device 1350 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 1350 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1350 when the computing device is incorporated into the AR space can cause a particular action to occur in the AR space.

In some implementations, a touchscreen of the computing device 1350 can be rendered as a touchpad in AR space. A user can interact with the touchscreen of the computing device 1350. The interactions are rendered, in AR headset 1390 for example, as movements on the rendered touchpad in the AR space. The rendered movements can control virtual objects in the AR space.

In some implementations, one or more output devices included on the computing device 1350 can provide output and/or feedback to a user of the AR headset 1390 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1350 may appear as another object in a computer-generated, 3D environment. Interactions by the user with the computing device 1350 (e.g., rotating, shaking, touching a touchscreen, swiping a finger across a touch screen) can be interpreted as interactions with the object in the AR space. In the example of the laser pointer in an AR space, the computing device 1350 appears as a virtual laser pointer in the computer-generated, 3D environment. As the user manipulates the computing device 1350, the user in the AR space sees movement of the laser pointer. The user receives feedback from interactions with the computing device 1350 in the AR environment on the computing device 1350 or on the AR headset 1390. The user's interactions with the computing device may be translated to interactions with a user interface generated in the AR environment for a controllable device.

In some implementations, a computing device 1350 may include a touchscreen. For example, a user can interact with the touchscreen to interact with a user interface for a controllable device. For example, the touchscreen may include user interface elements such as sliders that can control properties of the controllable device.

Computing device 1300 is intended to represent various forms of digital computers and devices, including, but not limited to laptops, desktops, workstations, personal digital assistants, servers, blade servers, mainframes, and other appropriate computers. Computing device 1350 is intended to represent various forms of mobile devices, such as personal digital assistants, cellular telephones, smartphones, and other similar computing devices. The components shown here, their connections and relationships, and their functions, are meant to be example only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A system, including:
a head mounted display (HMD) configured to display virtual content, the HMD including:
a display device;
a camera;
an illumination device; and
a controller controlling operation of the HMD; and
an external device paired with the HMD, the external device including:
an interface device;
a first active marker and a second active marker detectable by the camera of the HMD;
at least one passive marker detectable by the camera of the HMD; and
a controller controlling operation of the external device,
wherein, during a block of operation time in which the external device is within a field of view of the camera of the HMD:
during at least one period within the block of operation time in which the first active marker is on, the second active marker is off and the illumination device is off;
during at least one period within the block of operation time in which the second active marker is on, the first active marker is off and the illumination device is off; and
during at least one period during the block of operation time in which the illumination device is on, the first active marker is off and the second active marker is off; and
wherein the controller of the HMD is configured to control the display device such that virtual content displayed by the HMD is aligned with the external device in response to detection of at least one of the first active marker, the second active marker, or the at least one passive marker within a field of view of the camera of the HMD.

2. The system of claim 1, wherein the at least one passive marker includes a retroreflective marker that is detectable by the camera of the HMD in response to illumination of the retroreflective marker by the illumination device of the HMD.

3. The system of claim 2, wherein
the first active marker is located at a first position on the external device;
the second active marker is located at a second position on the external device; and
the at least one passive marker includes a retroreflective marker at a third position on the external device.

4. The system of claim 3, wherein
the first active marker includes a light source that selectively emits light detected by the camera of the HMD; and
the second active marker includes a light source that selectively emits light detected by the camera of the HMD.

5. The system of claim 4, wherein at least one of
an intensity of the light emitted by the light source of the first active marker is different than an intensity of the light emitted by the light source of the second active marker; or
a pattern of the light emitted by the light source of the first active marker is different than a pattern of the light emitted by the light source of the second active marker.

6. The system of claim 3, wherein, when the external device is within the field of view of the camera of the HMD, the first active marker and the second active marker are detectable by the camera; and
the retroreflective marker is detectable by the camera in response to illumination of the field of view of the camera by the illumination device.

7. The system of claim 6, wherein the controller of the external device is configured to control operation of the first active marker and the second active marker, and the controller of the external device is configured to control operation of the illumination device.

8. The system of claim 1, wherein the controller of the HMD is configured to:
detect position data of the external device based on detection of the first active marker, the second active marker, and the at least one passive marker;
combine the position data with at least one of acceleration data or orientation data received from the external device; and
determine a six-degree-of-freedom (6DOF) position of the external device relative to the HMD based on the combined position data and at least one of acceleration data or orientation data.

9. The system of claim 8, wherein the controller of the HMD is configured to control operation of the display device to display the virtual content in an augmented reality environment, at a position corresponding to the determined 6DOF position of the external device.

10. The system of claim 1, wherein the controller of the HMD is configured to control the display device such that the virtual content displayed by the HMD is aligned with an interface surface of the external device, and maintains alignment with a position and an orientation of the interface device of the external device while the external device is detected within the field of view of the camera of the HMD.

11. The system of claim 1, wherein the interface device includes at least one of an input device or an output device, and wherein the controller of the HMD is configured to control the display device to display virtual content in response to an input detected at the interface device of the external device.

12. A computer-implemented method, comprising:
detecting, by a camera of a head mounted display (HMD), at least one active marker and at least one passive marker, on an external device within a field of view of the camera, the external device being paired with the HMD, including, during a block of operation time in which the external device is within the field of view of the camera of the HMD:
detecting a first active marker of the external device during at least one period in which the first active marker is on, a second active marker of the external device is off and an illumination device of the HMD is off;
detecting the second active marker during at least one period in which the second active marker is on, the first active marker is off and the illumination device is off; and
detecting the at least one passive marker during at least one period in which the illumination device is on, the first active marker is off and the second active marker is off;
detecting, by a processor of the HMD, position data of the external device based on the detection of the at least one active marker and the at least one passive marker;
combining, by the processor, the position data with acceleration data and orientation data received from the external device;

determining, by the processor, a six-degree-of-freedom (6DOF) position of the external device relative to the HMD based on the combined position data, acceleration data and orientation data; and triggering for display, by a display device of the HMD, virtual content at a position corresponding to the 6DOF position of the external device.

13. The computer-implemented method of claim 12, wherein
   detecting the at least one active marker includes:
      detecting the first active marker at a first position on the external device; and
      detecting the second active marker at a second position on the external device; and
   detecting the at least one passive marker includes:
      detecting a retroreflective marker at a third position on the external device.

14. The computer-implemented method of claim 13, wherein
   detecting the first active marker includes detecting light selectively emitted by a light source of the first active marker;
   detecting the second active marker includes detecting light selectively emitted by a light source of the second active marker; and
   detecting the retroreflective marker includes detecting the retroreflective marker in response to illumination of the field of view of the camera by an illumination device of the HMD.

15. The computer-implemented method of claim 14, wherein at least one of:
   an intensity of the light emitted by the light source of the first active marker is different than an intensity of the light emitted by the light source of the second active marker; or
   a pattern of the light emitted by the light source of the first active marker is different than a pattern of the light emitted by the light source of the second active marker.

16. The computer-implemented method of claim 12, wherein triggering the display of the virtual content at the position corresponding to the 6DOF position of the external device includes aligning the display of the virtual content with a 6DOF position of an interface device of the external device, and maintaining alignment of the virtual content with the 6DOF position of the interface device while the external device is detected within the field of view of the camera of the HMD.

17. A non-transitory, computer-readable medium having instructions stored thereon that, when executed by a computing device, cause the computing device to:
   detect, by a camera of the computing device, a first active marker, a second active marker and at least one passive marker, on an external device during a block of operation time in which the external device is within a field of view of the camera, the external device being paired with the computing device, including:
      detect the first active marker ice during at least one period in which the first active marker is on, the second active marker is off and an illumination device of the computing device is off;
      detect the second active marker during at least one period in which the second active marker is on, the first active marker is off and the illumination device of the computing device is off; and
      detect the at least one passive marker during at least one period in which the illumination device is on, the first active marker is off and the second active marker is off;
   detect, by a processor of the computing device, position data of the external device based on the detection of the the first active marker, the second active marker and the at least one passive marker;
   combine, by the processor, the position data with acceleration data and orientation data received from the external device;
   determine, by the processor, a six-degree-of-freedom (6DOF) position of the external device relative to the computing device based on the combined position data, acceleration data and orientation data; and
   trigger for display, by a display device of the computing device, virtual content at a position corresponding to the 6DOF position of the external device.

18. The non-transitory, computer-readable medium of claim 17, wherein the instructions cause the computing device to:
   detect the first active marker at a first position on the external device based on light emitted by a light source of the first active marker;
   detect the second active marker at a second position on the external device based on light emitted by a light source of the second active marker; and
   detect the at least one passive marker at a third position on the external device based on light, emitted by the illumination device of the computing device and reflected back to the camera by the at least one passive marker.

19. The non-transitory, computer-readable medium of claim 17, wherein the instructions cause the computing device to align the virtual content a 6DOF position of an interface device of the external device while the external device is detected within the field of view of the camera of the computing device.

* * * * *